(12) United States Patent
Brunker et al.

(10) Patent No.: US 6,969,268 B2
(45) Date of Patent: Nov. 29, 2005

(54) IMPEDANCE-TUNED TERMINAL CONTACT ARRANGEMENT AND CONNECTORS INCORPORATING SAME

(75) Inventors: David L. Brunker, Naperville, IL (US); Daniel L. Dawiedczyk, Naperville, IL (US); Maxwill P. Bassler, Hampshire, IL (US); Patrick R. Casher, North Aurora, IL (US)

(73) Assignee: Molex Incorporated, Lisle, IL (US)

( * ) Notice: Subject to any disclaimer, the term of this patent is extended or adjusted under 35 U.S.C. 154(b) by 53 days.

(21) Appl. No.: 11/071,928

(22) Filed: Mar. 4, 2005

(65) Prior Publication Data

US 2005/0159040 A1 Jul. 21, 2005

Related U.S. Application Data

(63) Continuation of application No. 10/670,639, filed on Sep. 25, 2003, which is a continuation-in-part of application No. 10/362,704, filed as application No. PCT/US02/18372 on Jun. 11, 2002.

(60) Provisional application No. 60/413,330, filed on Sep. 25, 2002.

(51) Int. Cl.[7] .......................................... H01R 13/648
(52) U.S. Cl. ....................... 439/108; 439/608; 439/941; 439/79
(58) Field of Search ................................ 439/106–109, 439/607–610, 941, 79

(56) References Cited

U.S. PATENT DOCUMENTS

| 4,337,989 | A | 7/1982 | Asick |
| 4,628,410 | A | 12/1986 | Goodman et al. |
| 4,678,121 | A | 7/1987 | Douty et al. |
| 4,790,765 | A | 12/1988 | Ehrenfels et al. |
| 4,824,383 | A | 4/1989 | Lemke |
| 4,981,447 | A | 1/1991 | Ichitsubo |

(Continued)

FOREIGN PATENT DOCUMENTS

EP 0486298 A1 5/1992

(Continued)

OTHER PUBLICATIONS

WIPO Publication No. WO 00/10228, published on Feb. 24, 2000, Molex Incorporated.

(Continued)

*Primary Examiner*—Truc Nguyen
(74) *Attorney, Agent, or Firm*—Thomas D. Paulius

(57) ABSTRACT

A terminal contact arrangement for a connector promotes reduction in deviation of the impedance of the connector when mated to an opposing connector and energized. The connector has an insulative housing with a plurality of terminal-receiving passages disposed in it. Conductive terminals are supported in some, but not all of the passages. The terminal contain distinct terminal sets that include a pair of differential signal terminals and at least two associated ground reference terminals. The two associated ground reference terminals are interconnected together so that electrically, they act as a single ground terminal having a width equal to the sum of the widths of the two connected ground reference terminals. The ground reference terminals of the sets are disposed in a single row of terminals, while the differential signal terminals of the same terminal set are disposed in another row of terminals spaced apart from the row of ground reference terminals. The differential signal terminals are separated from each other within their terminal row by an empty passage so that the two differential signal terminals of each terminal set are spaced farther apart from each other than they are spaced apart from their associated ground reference terminals.

7 Claims, 14 Drawing Sheets

U.S. PATENT DOCUMENTS

| | | |
|---|---|---|
| 5,256,085 A | 10/1993 | Tan et al. |
| 5,490,786 A | 2/1996 | Mosquera et al. |
| 5,525,067 A | 6/1996 | Gatti |
| 5,876,248 A | 3/1999 | Brunker et al. |
| 5,954,541 A | 9/1999 | Ozai et al. |
| 6,007,352 A | 12/1999 | Azuma et al. |
| 6,139,371 A | 10/2000 | Troutman |
| 6,142,804 A | 11/2000 | Peloza et al. |
| 6,164,995 A | 12/2000 | Peloza et al. |
| 6,280,209 B1 | 8/2001 | Bassler et al. |
| 6,350,134 B1 * | 2/2002 | Fogg et al. .............. 439/79 |
| 6,454,605 B1 | 9/2002 | Bassler et al. |
| 6,457,983 B1 | 10/2002 | Bassler et al. |
| 6,692,272 B2 * | 2/2004 | Lemke et al. .......... 439/108 |
| 6,767,252 B2 * | 7/2004 | McGrath et al. ........ 439/637 |

FOREIGN PATENT DOCUMENTS

| | | |
|---|---|---|
| EP | 0529350 A2 | 3/1993 |
| EP | 0793297 A2 | 9/1997 |
| EP | 0836247 A2 | 4/1998 |
| EP | 1239552 A1 | 9/2002 |
| JP | 09-221691 | 3/1999 |

OTHER PUBLICATIONS

WIPO Publication No. WO 89/11169, published on Nov. 16, 1989, E.I. Du Pont de Nemours and Company.

International Search Report for International Application No. PCT/US03/30106 completed on Mar. 8, 2004.

Meeting Minutes from VESA Flat Panel Display Interface Committee, Jun. 13, 1996, VESA Doc#FPD 96/43.

Presentation by Don Chambers of JAE Electronics, Inc. Considerations for Connectors for the Vesa Flat Panel Display Interface-2, VESA Doc FPDI96/39, date believed Jun. 13, 1996.

Presentation by JAE Electronics, Inc. I/O Connector for LCD Display FI Series (for Vesa FPDI-2), VESA Doc# FPDI91/22, date beleived to be Feb. 13, 1997.

* cited by examiner

| G | $G_{RA}$ | $+V_{CC}$ | B+ | X | B− |
|---|---|---|---|---|---|
| A+ | X | A− | $-V_{CC}$ | $G_{RB}$ | G |

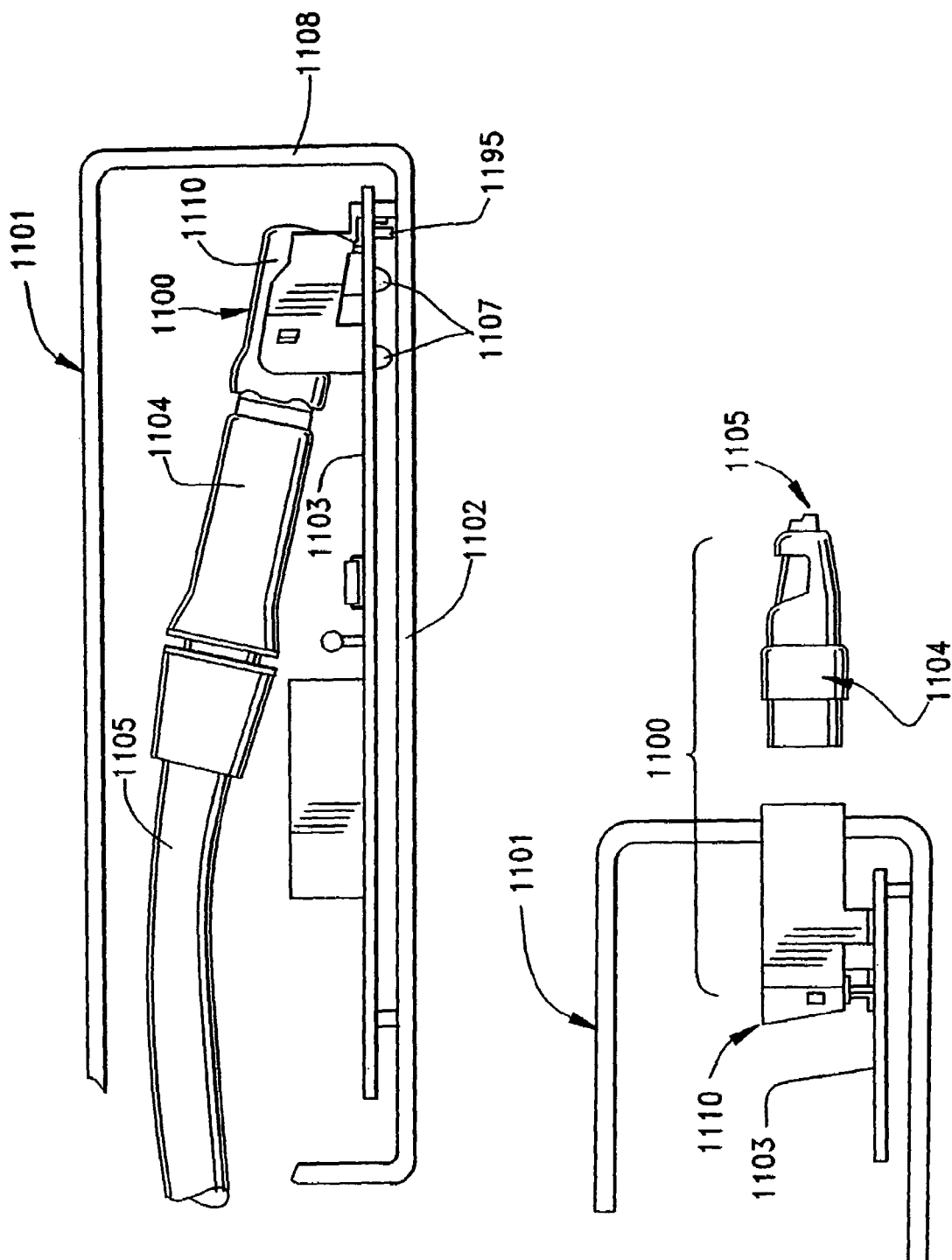

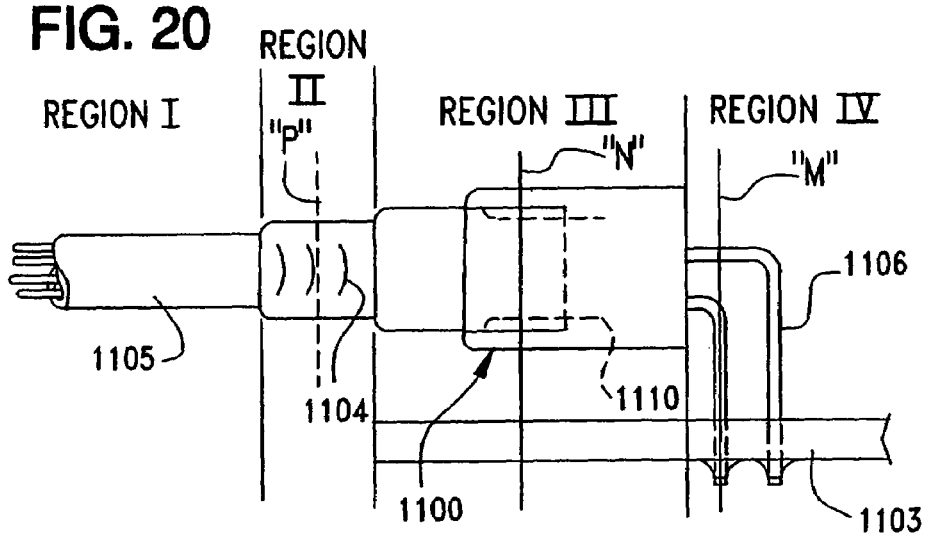
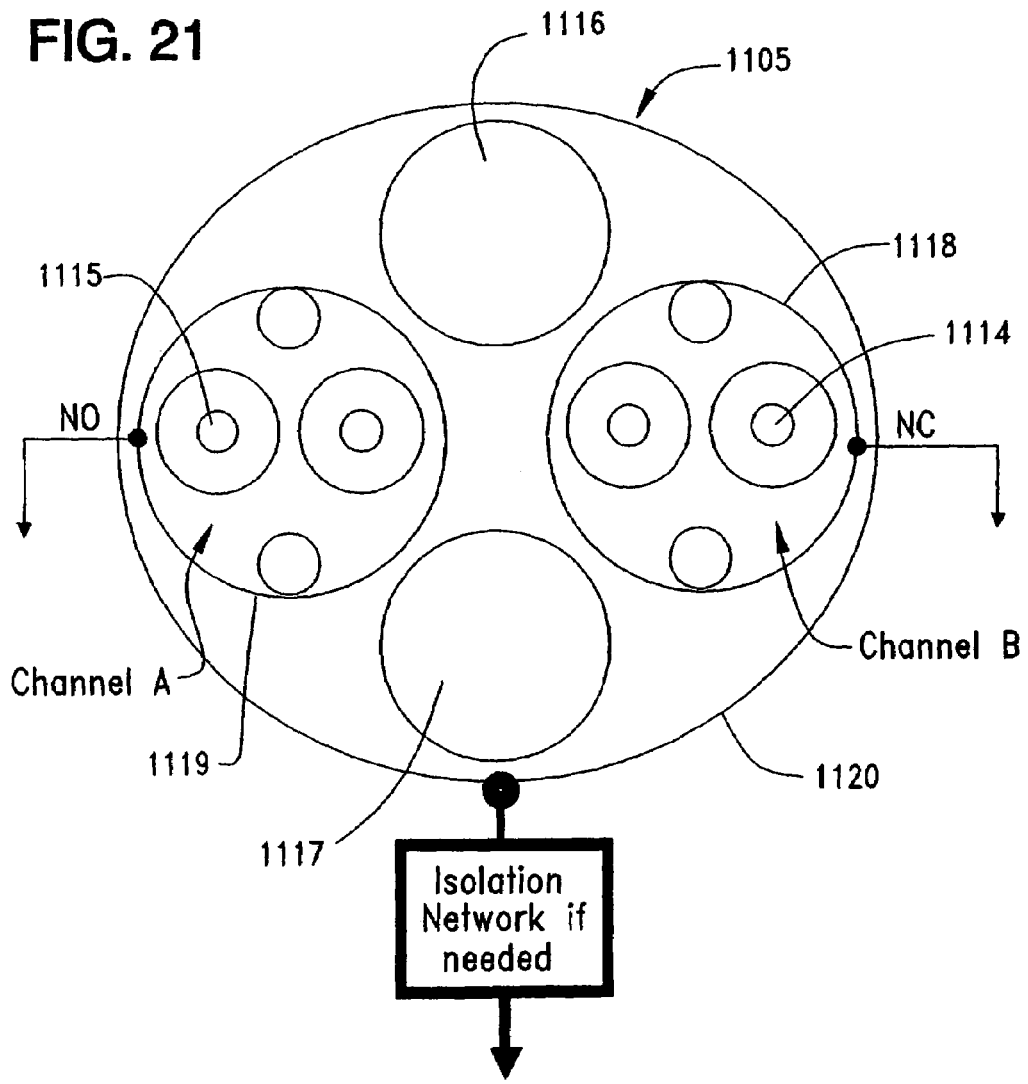

IMPEDANCE-TUNED TERMINAL CONTACT ARRANGEMENT AND CONNECTORS INCORPORATING SAME

REFERENCE TO RELATED APPLICATIONS

This application is a continuation of Ser. No. 10/670,639 filed Sep. 25, 2003, which is a continuation-in-part application of prior application Ser. No. 10/362,704, filed Dec. 22, 2003 as a National Phase filing of International Application No. PCT/US02/18372 filed Jun. 11, 2002 and also claims priority of U.S. Provisional Application Ser. No. 60/413,330, filed Sep. 25, 2002.

BACKGROUND OF THE INVENTION

The present invention relates generally to terminations for connectors and more particularly to connectors having selected impedances that are used in connection with signal cables, such as in an automotive environment.

Many electronic devices rely upon transmission lines to transmit signals between related devices or between peripheral devices and circuit boards of a computer. These transmission lines incorporate signal cables that are capable of high-speed data transmissions.

These signal cables may use what are known as one or more twisted pairs of wires that are twisted together along the length of the cable, with each such twisted pair being encircled by an associated grounding shield. These twisted pairs typically receive complementary signal voltages, i.e., one wire of the pair may see a +1.0 volt signal, while the other wire of the pair may see a −1.0 volt signal. Thus, these wires may be called "differential" pairs, a term that refers to the voltage difference between the two conductors in a signal pair. Such a twisted pair construction minimizes or diminishes any induced noise voltage from other electronic devices and thereby eliminates electromagnetic interference.

As signal cables are routed on a path to an electronic device, they may pass by or near other electronic devices that emit their own electric field. These devices have the potential to create electromagnetic interference to transmission lines such as the aforementioned signal cables. Automotive environments are particularly harsh in electromagnetic interference. Such interference is frequently caused by high voltage ignition signals. Other sources of interference in the automotive environment include alternator charging systems and many switched devices, such as air conditioning. However, this twisted pair construction tends to minimize or diminish any induced electrical fields and thereby substantially eliminates electromagnetic interference.

In order to maintain electrical performance integrity from such a transmission line, or cable, to the circuitry of an associated electronic device, it is desirable to obtain a substantially constant impedance throughout the transmission line, from circuit to circuit or to avoid large discontinuities in the impedance of the transmission line. The difficulty of controlling the impedance of a connector at a connector mating face is well known because the impedance of a conventional connector typically drops through the connector and across the interface of the two mating connector components. Although it is relatively easy to maintain a desired impedance through an electrical transmission line, such as a cable, by maintaining a specific geometry or physical arrangement of the signal conductors and the grounding shield, an impedance discontinuity is usually encountered in the area where a cable is mated to a connector. It is therefore desirable to maintain a desired impedance throughout the connector and its connection to the cable.

Typical signal cable terminations involve the untwisting of the wire pairs and the unbraiding of the braided shield wire and/or foil surrounding the wire pairs. These wires are unbraided manually and this manual operation tends to introduce variability into the electrical performance. This is caused by unbraiding the grounding shield wires, then typically twisting them into a single lead and subsequently welding or soldering the twisted tail of a connector terminal. This unbraiding and twisting often results in moving the signal conductors and grounding shield out of their original state in which they exist in the cable. This rearrangement may lead to a decoupling of the ground and signal wires from their original state that may result in an increase of impedance through the cable-connector junction. Moreover, this twisting introduces mechanical variability into the termination area in that although a cable may contain multiple differential pairs, the length of the unbraided shield wire may vary from pair to pair. This variability and rearrangement changes the physical characteristics of the system in the termination area which may result in an unwanted change (typically an increase) in the impedance of the system in the area.

Additionally, it is common for the signal and ground termination tails of a connector to be arranged into whatever convenient space is present at the connector mounting face without any control of the geometry or spatial aspects of the signal and ground terminals being considered. When signal wires and ground shields are pulled apart from the end of a cable, an interruption of the cable geometry is introduced. It is therefore desirable to maintain this geometry in the termination area between the cable and the cable connector to reduce any substantial impedance increase from occurring due to the cable termination.

The present invention is therefore directed to a terminal contact arrangement and function directed at providing improved connections between connectors and between the mating portions of two interengaging connectors that provides a high level of performance and which maintains the electrical characteristics of the cable in the termination area, particularly in an automotive environment.

SUMMARY OF THE INVENTION

Accordingly, it is a general object of the present invention to provide an improved termination structure for use in high-speed data transmission connections in which the impedance discontinuity through the cable termination and connector is minimized so as to attempt to better match the impedance of the transmission line.

Another object of the present invention is to provide an improved connector for effecting a high-performance connection between a circuit board and an opposing connector terminated to a transmission line, wherein the transmission line includes multiple pairs of differential signal wires, each such pair having an associated ground, the connector having pairs of signal terminals and ground terminals associated therewith arranged in triangular fashions so as to reduce impedance discontinuities from occurring when the connector is mated to the opposing connector and further, by inverting adjacent triangular associated sets of signal and ground terminals, the connector is given a specific density characteristic while maintaining a desired preselected impedance through the connector.

Another object of the present invention is to provide a termination assembly for use in conjunction with signal cables that provides a connection between the twisted wire pairs and grounding shield of the cable and the connector, the termination assembly having an improved electrical performance due to its structure.

A further object of the present invention is to provide an improved termination assembly for effecting a high-performance termination between a transmission line having at least one pair of differential signal wires and an associated ground and a connector having at least two signal terminals and a plurality of ground terminals disposed adjacent to the signal terminals to provide improved coupling between the signal terminals and the ground terminals.

Yet another object of the present invention is to provide a connector for high-density applications wherein the connector has a plurality of terminal triads, which are triangular arrangements of two signal and one ground terminals, the ground terminals being located at the apex of each triangular arrangement, the connector having at least two such triads, with one triad being inverted with respect to the other triad.

It is yet a further object of the present invention to provide a connector for providing a connection between a circuit board and a connector associated with a signal cable, wherein each such triad corresponds to an individual channel of the transmission line and the channels are at least partially isolated from each other within the connector by an air gap.

A still other object of the present invention is to provide a high-density connector having a housing formed from a dielectric material, the housing having a plurality of cavities disposed therein, each such cavity including a conductive terminal, the housing cavities being arranged in triangular sets within the connector and each such triangular set including a pair of signal terminals and one ground terminal, adjacent triangular sets being inverted with respect to each other, the housing further including recesses formed therein that extend between adjacent triangular sets to provide an air gap having a dielectric constant different than that of the connector housing.

A still further object of the present invention is to provide a connector having a plurality of terminals grouped in sets of three, each set including two signal terminals and one ground terminal, the terminals of each set being arranged in a triangular fashion and disposed at respective apexes of the triangles, the space between each such set of terminals being filled with a first dielectric material to form a terminal "module" that is inserted into cavities of the connector housing and which is supported by the connector housing, the connector housing being formed from a second dielectric material.

Yet still another object of the present invention is to provide an improved high-density connector with controlled impedance for connecting multi-channel transmission lines to electronic devices, the connector including a housing formed from an electrically insulative material, a plurality of conductive terminals supported by the housing, the terminals including at least two sets of three distinct terminals, each set accommodating a distinct channel in the transmission line and each terminal set including two differential signal terminals and one associated ground terminal, the three terminals of each set being disposed at corners of an imaginary triangle and the imaginary triangles of each terminal set being inverted with respect to each other, each terminal set further being supported on a carrier formed of an insulative material having a first dielectric constant, each such carrier being received within a cavity formed in the connector housing, each terminal set being separated from each other by recesses formed in the connector housing that define air gaps between the terminal sets.

It is a further object of the present invention to provide such a connector wherein, by varying the effective size of the ground terminal and its location relative to its two associated signal wires, the impedance of the connector may be "tuned" to obtain a preselected impedance through the connector.

It is a yet further object of the present invention is to provide a connector for connecting cables, such as in accordance with the IEEE 1394b standard, to a circuit board of an electronic device, wherein the connector has a number of discrete, differential signal wires and associated grounds equal in number to those contained in the cables, the ground terminals of the connector being configured in quantity and location with respect to the signal terminals of the connector in order to minimize the drop in impedance through the connector.

A still another object of the present invention is to provide a connector for termination to a cable, wherein a plurality of ground terminals are positioned within the cable connector housing and are spaced apart from two associated signal terminals in the connector housing, the plurality of ground terminals being commoned to effectively provide a singular ground terminal that is of a similar or greater effective width as compared to the distance between the signal terminals.

A yet further object of the present invention to provide a cable connector for use with differential signal wire pairs, wherein a plurality of ground terminals are commoned together and in a spaced-apart relationship to the terminals for the differential signal wire pairs, with the terminals for the differential signal wire pairs spaced from each other by one vacant terminal position so that the differential signals are decoupled from each other and the differential signals are each more closely coupled to the plurality of commoned ground terminals.

Another object of the present invention is to provide a cable connector for use with differential signal wire pairs extending the length of the cable, the cable connector having a plurality of ground terminals that are commoned together and two signal terminals that are arranged and maintained in an essentially triangular orientation with the commoned ground terminals through the connector and at the termination areas thereof.

The present invention accomplishes these objects by virtue of its structure. In order to obtain the aforementioned objects, one principal aspect of the invention that is exemplified by one embodiment thereof includes a first connector for a circuit board which has a housing that supports, for each twisted pair of wires in the mating signal cable, three conductive terminals in a unique pattern of a triplet, with two of the terminals carrying differential signals, and the remaining terminal being a ground terminal that serves as a ground plane or ground return to the differential pair of signal wires. The first connector supports multiple terminal triplets, in an inverted fashion (widthwise along the connector mating face) so that two rows of terminals are defined in the first connector, the signal terminals of a first triplet are disposed in one row in the connector and the ground terminal of that first triplet is disposed in the other row of the connector, while the signal terminals of a second, or of adjacent triplets, are disposed in the other row of the connector and the ground terminal of this second triplet or of two adjacent triplets are disposed in the one row of the connector. The signal and ground terminals of adjacent triplets are arranged in an inverted fashion. A second connector for a cable is provided that mates with the first connector and their second connector has multiple terminal triplets arranged to mate with their corresponding terminal triplets of the first connector.

The arrangement of these terminals in sets of three within the first connector permits the impedance to be more effectively controlled throughout the first connector, from the points of engagement with the cable connector terminals to be points of attachment to the circuit board.

In this manner, each such triplet of the first connector includes a pair of signal terminals having contact portions that are aligned together in side-by-side order, and which are also spaced apart a predetermined distance from each other. The ground terminal is spaced apart from the two signal terminals in a second row.

In another principal aspect of the present invention, the width of the ground terminals and their spacings from the signal terminals of each such triplet may be chosen so that the three terminals may have desired electrical characteristics such as capacitance and the like, all of which will affect the impedance of the connector.

By this impedance-regulating ground structure, a greater opportunity is provided to reduce the impedance discontinuity which occurs in a connector without altering the mating positions or the pitch of the differential signal terminals. Hence, this aspect of the present invention may be aptly characterized as providing a "tunable" terminal arrangement for each differential signal wire pair and associated ground wire arrangement found either in a cable or in other circuits.

In another principal aspect of the present invention, these tunable triplets are provided within the connector housing in an inverted fashion. That is, the ground terminals of adjacent terminal triplets lie in different terminal rows of the connector, as do the signal terminals in alternating fashion along the width of the connector. When multiple terminal triplets are utilized in the connectors, other terminals of the connector such as power and reference terminals may be situated in the connector at a midpoint thereof between the terminal triplets.

In still another principal aspect of the present invention, the connector has each of its inverted triplets or triads (i.e., an associated set of two signal terminals and one ground terminal) arranged in a triangular orientation throughout their length within the connector housing in order to maintain a desired, predetermined spatial relationship among these three terminals within each triplet or triad.

In yet another principal aspect of the present invention, the connector housing may be modified in certain ways to accommodate the arrangement of terminal triplets with the housing. In one such instance, the housing may have openings in the form of recesses, slots or other similar cavities that are interposed between adjacent terminal triplets. The use of one or more such recesses introduces a slight air gap between the terminal triplets and because the dielectric constant of air differs from that of the connector housing material, it provides isolation between triplets and further enhances the affinity among the two differential signal terminals and the associated ground that make up each such triplet.

In another such instance, the terminal triplets are formed together as a single piece, in the form an insert or module, that is received within a corresponding opening formed in the connector housing. The terminals of the triplets may be molded directly into the insert, or module, such as by insert or over molding and the molding material used to form a body portion of the triplet may be chosen to have a different dielectric constant from the dielectric constant of the connector housing so that the two dielectric constants differ from each other so that the dielectric constant of the connector housing may be chosen to maintain isolation between adjacent terminal triplets and the dielectric constant of the triplet assembly may be chosen to enhance the affinity of the triplet terminals for each other.

In another principal aspect of the invention, as exemplified by another embodiment thereof, a receptacle connector for a circuit board which has a housing having at least three conductive terminals arranged in an effective pattern of a triplet, with two of the terminals carrying differential signals, and the remaining terminal being a ground terminal that is comprised of a plurality of individual ground terminals. Preferably, the plurality of individual ground terminals are interconnected or "commoned" together at the connector, and in a preferred embodiment, this interconnection occurs along the body or tail portions of the ground terminals. A plug connector for the end of a cable mates with the receptacle connector, and this plug connector also has the differential signal and ground terminals effectively arranged in a complementary triplet pattern of conductive terminals which are terminated to the signal and ground wires of the cable. Preferably, an unused terminal position is interposed between the two differential signal terminals in both the receptacle connector and the plug connector so that the differential signals are decoupled from each other, and so that the differential signals are more closely coupled to the plurality of ground terminals. The plurality of ground terminals are electrically in common so that the plurality of ground terminals acts a single wide terminal, or a common ground path disposed in a spaced-apart plane from the two differential signal terminals.

The arrangement of these three terminals within the connector permits the impedance to be more effectively controlled throughout the receptacle connector, from the points of engagement with the plug connector terminals to the points of attachment to the circuit board. In this manner, each such effective triplet includes a pair of signal terminals that are aligned together in side-by-side order, and which are also spaced apart a predetermined distance from each other. The plurality of ground terminals extend along a different plane than that defined by the differential signal terminals, with the signal terminals located closer to the plurality of ground terminals than to each other.

The effective width of this plurality of ground terminals and its spacing from the signal terminals may be chosen so that the signal and ground terminals may have desired electrical characteristics such as capacitance and the like, which affect the impedance of the connector. The effective width of the plurality of ground terminals is thereby increased in the contact mating area of the terminals and may also be increased in the transition area that occurs between the contact and termination areas of the terminals. By this structure, a greater opportunity is provided to reduce the impedance discontinuity which occurs in a connector without altering the mating positions or the pitch of the differential signal terminals. Hence, this aspect of the present invention may be aptly characterized as providing a "tunable" terminal arrangement for each differential signal wire pair and associated ground wire arrangement found either in a cable or in other circuits.

In another principal aspect of the present invention, two or more such tunable effective triplets may be provided within the connector housing, but inverted with respect to each other. Alternatively, additional ground terminals may be interposed between the two sets of triplets, or terminals that supply electrical power through the connector may be located between and provide separation of the effective triplets. Such power supply terminals generally act as additional low impedance terminals, in a manner substantially similar to the plurality of ground terminals, to provide coupling to the differential signal terminals and to thereby control impedance.

These and other objects, features and advantages of the present invention will be clearly understood through consideration of the following detailed description.

BRIEF DESCRIPTION OF THE DRAWINGS

In the course of the following detailed description, reference will be made to the accompanying drawings wherein like reference numerals identify like parts and in which:

FIG. 18 is an elevational view of a cable connector assembly of the invention in place on a circuit board of an electronic device illustrating an "internal" environment in which the present invention has utility;

FIG. 19 is an elevational view of a cable connector assembly of the invention in place on a circuit board of an electronic device and extending to the exterior of the device to illustrate an "external" environment in which the present invention has utility;

FIG. 20 is a schematic view of the connector interface area between a cable and board connector;

FIG. 21 is a cross-sectional view of the interior construction of a cable for use with the connectors of the present invention;

DETAILED DESCRIPTION OF THE PREFERRED EMBODIMENTS

Figure 1:
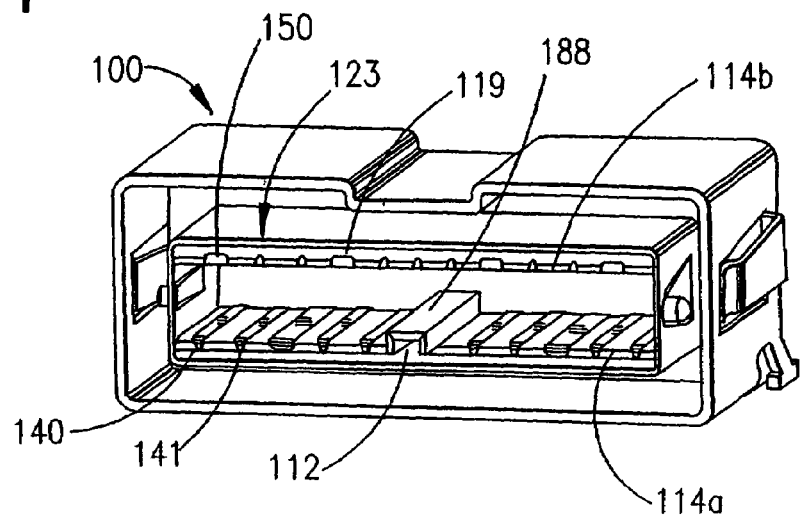
FIG. 1 is a perspective view of a socket, or receptacle, connector constructed in accordance with the principles of the present invention for mounting on a supporting circuit board.
Figure 2:
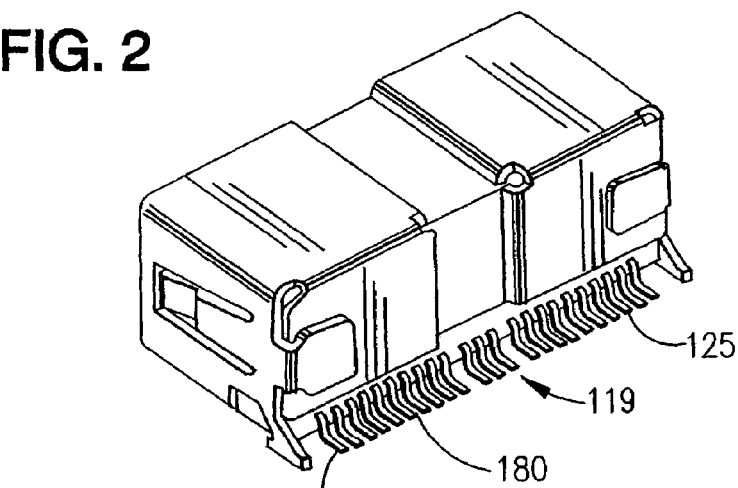
FIG. 2 is a perspective view of the connector of FIG. 1, but illustrating the rear end thereof.

The present invention is directed to an improved connector particularly useful in enhancing the performance of high-speed cables, particularly in input-output ("I/O") applications as well as other types of applications. More specifically, the present invention attempts to impose a measure of mechanical and electrical uniformity on the termination area of the connector to facilitate its performance, both alone and when combined with an opposing or mating connector.

Many peripheral devices associated with an electronic device, such as a video camera or camcorder, transmit digital signals at various frequencies. Other devices associated with a computer, such as the CPU portion thereof, operate at high speeds for data transmission. High speed cables are used to connect these devices to the CPU and may also be used in some applications to connect two or more CPUs together. A particular cable may be sufficiently constructed to convey high speed signals and may include differential pairs of signal wires, either as twisted pairs or individual pairs of wires.

The use of high speed electronics is becoming more prevalent in the automotive environment. For example, automotive manufacturers are considering implementing a central data communications backbone in vehicles to provide a convenience port to interface with consumer entertainment devices and personal computers. Ultimately, such a backbone may also interface with other vehicular operations. Data transmission speeds generally range from 100 Mbps (megabits per second) to 1.6 Gbps (gigabits per second). Thus, while the connectors of the present invention are generally based upon an automotive grade 0.64 mm terminal system, the present invention is also suitable for use in many other types of connectors.

However, this environment is known to have considerable electromagnetic interference (EMI). While shielded cables with internal twisted pair wires are fairly immune to such EMI, connecting such cables to the printed circuit boards (PCBs) of electronic devices presents a variety of potential problems, including potentially significant impedance discontinuities at the connector.

One consideration in high speed data transmissions is signal degradation. This involves crosstalk and signal reflection which is affected by the impedance of the cable and connector. Crosstalk and signal reflection in a cable may be easily controlled in a cable by shielding and the use of differential pairs of signal wires, but these aspects are harder to control in a connector by virtue of the various and diverse materials used in the connector, among other considerations. The physical size of the connector in high speed applications also limits the extent to which the connector and terminal structure may be modified to obtain a particular electrical performance.

Impedance mismatches in a transmission path can cause signal reflection, which often leads to signal losses, cancellation, or the like. Accordingly, it is desirable to keep the impedance consistent over the signal path in order to maintain the integrity of the transmitted signals. The connector to which the cable is terminated and which supplies a means of conveying the transmitted signals to circuitry on the printed circuit board of the device is usually not very well controlled insofar as impedance is concerned and it may vary greatly from that of the cable. A mismatch in impedances between these two elements may result in transmission errors, limited bandwidth and the like.

Figure 15:
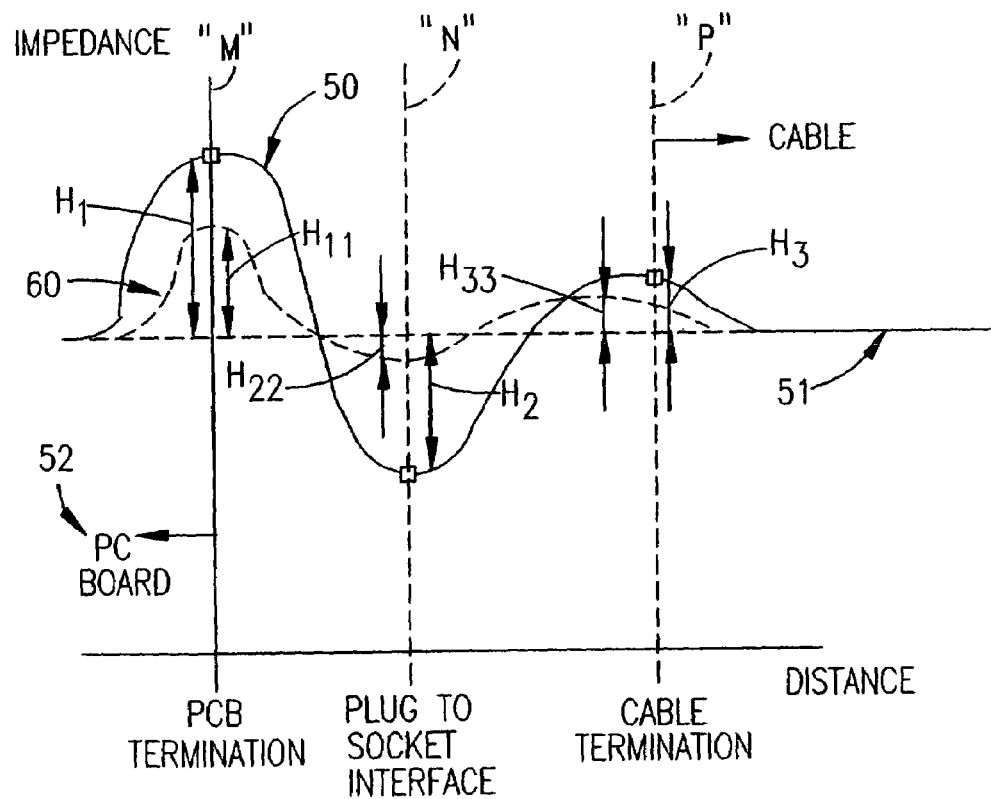
FIG. 15 is a diagram illustrating the typical impedance discontinuity experienced throughout a high-speed cable connection and also the reduction in this discontinuity that would be experienced with the connectors of the present invention.

FIG. 15 illustrates the impedance discontinuity that occurs through a conventional plug and receptacle connector assembly used for signal cables. The impedance through the signal cable approaches a constant, or baseline value, as shown to the right of FIG. 15 at 51. This deviation from the baseline is shown by the solid, bold line at 50. The cable impedance substantially matches the impedance of the circuit board at 52 shown to the left of FIG. 15 and to the left of the "PCB Termination" axis. The vertical axis "M" represents the point of termination between the socket, or receptacle, connector and the printed circuit board, while the vertical axis "N" represents the interface that occurs between the two mating plug and socket connectors, and the vertical axis "P" represents the point where the plug connector is terminated to the cable.

These corresponding regions defined by the axes "M", "N" and "P" can be seen in FIG. 20 for a typical connector assembly 100 of the socket and plug type that is disposed between a cable 105 and a printed circuit board (PCB) 103. As shown in FIG. 20, a connector 100 has a plurality of terminals 102 extending through through-holes in the PCB 103 for electrical connection to various portions of the PCB and to electronic circuitry typically mounted thereon. Of course, connector 100 could alternatively have its terminals 106 configured for a surface mount to the PCB 103.

The curve 50 of FIG. 15 represents the typical impedance "discontinuity" achieved with conventional connectors and indicates three peaks and valleys that occur, with each such peak or valley having respective distances (or values) $H_1$, $H_2$ and $H_3$ from the baseline as shown. These distances are measured in ohms with the base of the vertical axis that intersects with the horizontal "Distance" axis having a zero (0) ohm value. In these conventional connector assemblies, the high impedance as represented by $H_1$, will typically increase to about 150 ohms, whereas the low impedance as represented by $H_2$ will typically decrease to about 60 ohms. This wide discontinuity between $H_1$ and $H_2$ of about 90 ohms affects the electrical performance of the connectors with respect to the printed circuit board and the cable.

The present invention pertains to a connector and to connector termination structures that are particularly useful in I/O (" input-output") applications that has an improved structure that permits the impedance of the connector to be set so that it emulates the cable to which it is mated and reduces the aforementioned discontinuity. In effect, connectors of the present invention may be "tuned" through their design to improve the electrical performance of the connector.

FIG. 1 is a perspective view of a receptacle, or socket connector, 100 constructed in accordance with the principles of the present invention. The connector 100 is seen to include an insulative connector housing 112 that is formed from a dielectric material, typically a plastic. In the embodiment depicted, the connector housing 112 has two leaf, or arm portions 114a, 114b that extend out from a rear body portion 116 and which form part of a receptacle, or socket, of the connector. These housing leaf portions support a plurality of conductive terminals 119 as shown. The lower leaf portion 114a may include a series of grooves, or slots 118 that are disposed therein and are adapted to receive selected ones of the conductive terminals 119 therein. The upper leaf portion 114b, likewise includes similar grooves 120 that correspondingly receive the remaining terminals 119 of the connector 110.

Figure 4:
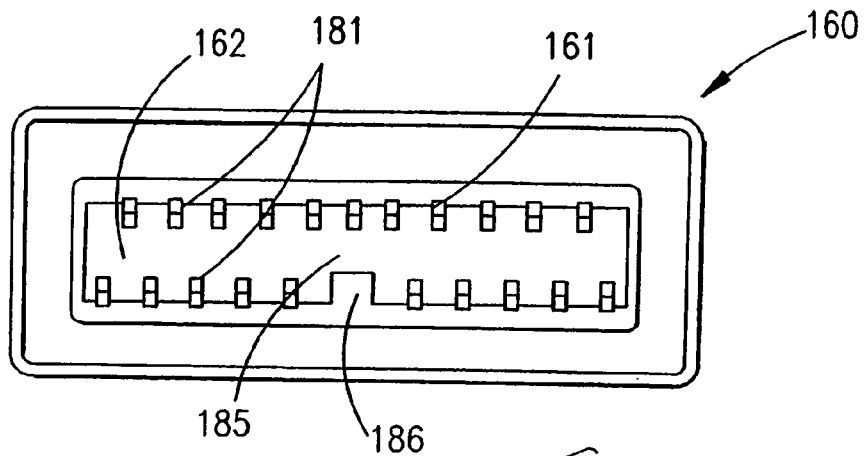
FIG. 4 is a front elevational view of a plug connector that mates with the receptacle connector of FIG. 1.

In order to provide overall shielding to the connector housing 112 and its associated terminals 119, the connector may include a first shell, or shield, 123 that is formed from sheet metal having a body portion 124 that encircles the upper and lower leaf portions 114a, 114b of the body portion 116. This first shield 123 may also preferably include foot portions 125 for mounting to a surface of a printed circuit board 102 and which provide a connection to a ground on the circuit board, although depending foot portions (not shown) may also be formed with the shield for use in through-hole mounting of the connector 100, although surface mounting applications are preferred. A second shield 126 may also be included that encircles part of the connector housing 112, near the rear portion thereof, and which extends forwardly to encircle the body portion 124 of the first shield 123. This second shield 126 may also utilize mounting feet 127 and utilize a rear flap that may be folded down over the rear of the connector housing 112, and which is secured in place by tabs 129 that are bent rearwardly over it. FIG. 4 illustrates a plug connector 160 that is matable with the socket/receptacle connector 100 of FIG. 1.

As mentioned earlier, one of the objects of the present invention is to provide a connector having an impedance that more closely resembles that of the system (such as the cable) impedance than is typically found in multi-circuit connectors. The present invention accomplishes this by way of what shall be referred to herein as the arrangement of a plurality of associated terminals that are arranged in distinct corresponding sets, each set being referred to herein as a "triplet" or as a "triad," which in its simplest sense is the arrangement of three distinct terminals. Examples of such triads, or triplets, are illustrated schematically in FIG. 6 wherein the terminals of each distinct set are shown interconnected together by imaginary, dashed lines, and the terminals being arranged at the respective apexes of each such imaginary triangle.

Figure 3:
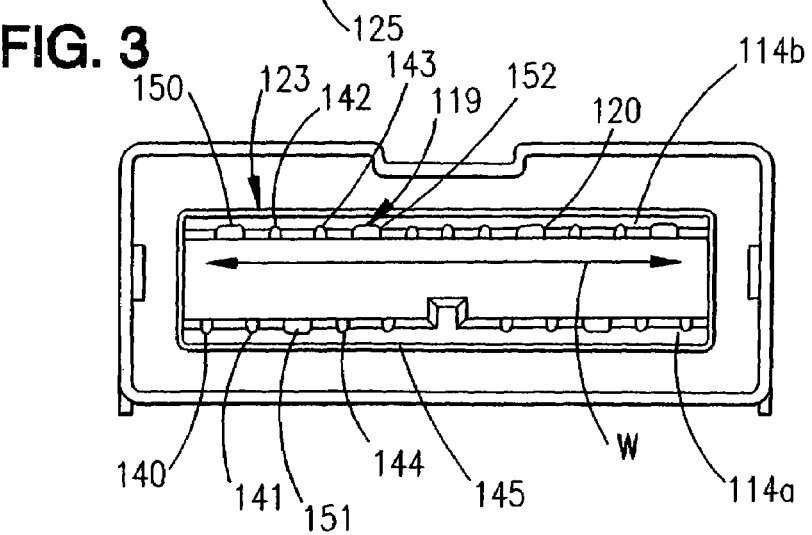
FIG. 3 is a front elevational view of the connector of FIG. 1.
Figure 6:
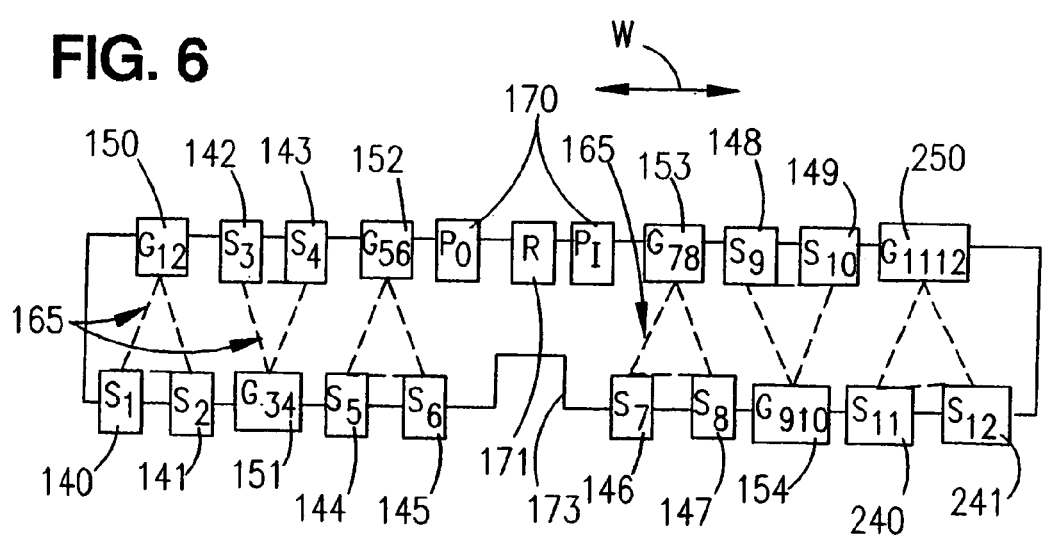
FIG. 6 is a diagrammatic view of the endface of the connector of FIG. 1, illustrating the spatial and inverted arrangement of the multiple associated terminal sets supported thereby.

Each such a triplet involves two signal terminals, such as the two terminals 140, 141 illustrated in FIGS. 1, 3 and 6 and a single ground terminal 150 that are arranged to mate with corresponding terminals 161 of a plug connector 160 held on a plug portion 162 and which are terminated to the wires of a differential pair of wires of a cable (not shown) that carry the same strength signals but which are complements of each other, i.e., +1.0 volts and −1.0 volts. Such a differential pair usually includes a ground reference. The arrangement of associated terminal sets within the connector 100 is shown schematically in FIG. 6. The two signal terminals are spaced apart from each other in a horizontal direction, while the ground terminal is spaced apart from the two signal terminals in the vertical direction so as to enhance electrical coupling among the three terminals of each triad. As can be seen in FIG. 6 (shown generally at 165 thereof), each terminal set has its two differential signal terminals and its ground reference terminal arranged in a triangular pattern, wherein each terminal may be considered, in one aspect as defining one apex of an imaginary triangle.

The terminals that comprise each associated set are interconnected in FIG. 6 by dashed lines 165 to form the aforementioned imaginary triangles, and it can be further seen that FIG. 6 illustrates six distinct terminal sets arranged widthwise of the connector, i.e., along the direction W, but in an inverted fashion. The six terminal sets include the following distinct terminals: 140, 141 and 150; 142, 143 and 151; 144, 145 and 152; 146, 147 and 153; 148, 149 and 154; and, 240, 241 and 250. Each such terminal set includes a pair of differential signal terminals, meaning that the terminals are connected to differential signal traces on a circuit board by way of terminal tails 180, and a single ground reference terminal.

Figure 5:
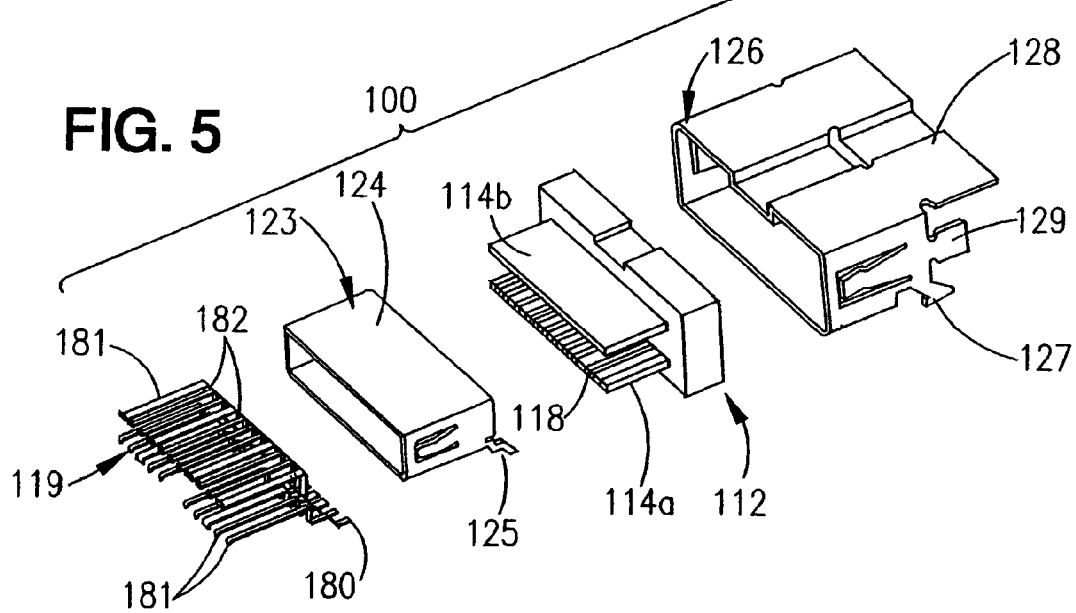
FIG. 5 is an exploded view of the connector of FIG. 1.

Using FIG. 5 as an example, the terminals all preferably each include a flat blade portion 181 that is used for a sliding contact, or mating, with opposing terminals 161 of the plug connector 160. As shown in FIGS. 1 & 5, the ground terminal 150, 151 of each triad is preferably wider than any single one of the associated signal terminals 140, 141 of the triad, and its width may exceed the combined width of the two signal terminals. The terminals 180 also preferably include body portions 182 interconnecting the contact blade and tail portions 181, 180 together. With this design, the terminals 119 may be easily stamped and formed. The terminals 119 are received within corresponding slots 118 of the lower leaf 114a of the housing body portion 112 of the receptacle connector and the free ends of the contact blade portions 181 may be held in openings formed at the ends of the slots 118.

In the plug connector of FIG. 4, the plug connector preferably has a solid plug body portion 185 and the terminals are disposed on opposite surfaces of the plug body portion 185. If desired, the plug body portion 185 may include a keyway that is adapted to receive a positive key 188 of the receptacle connector of FIG. 1. The key and keyway may be interposed between at least a pair of distinct terminal triplet sets, as illustrated.

The benefits of the "triad" aspect will now be discussed with respect to a single associated terminal set, namely the terminal set shown at the left of FIG. 6 and including signal terminal 140, 141 (shown as S1 and S2) and ground terminal 150 (G12). The two signal terminals 140 and 141 may be considered in one sense, as arranged in a triangular fashion with respect to the ground terminal 150. They may also be considered in another sense as "flanking" the ground terminal inasmuch as portions of the signal terminals may extend to a point somewhat exterior of the side edges of the ground terminal 150. The triangular relationship among these three associated terminals may vary and may include equilateral triangular relationships, isosceles triangular relationships, scalene triangular relationships and the like, with the only limitation being the desired width W of the connector 100.

The contact blade portions of the terminals 119 are cantilevered out from their respective body portions and therefore lie in different planes than the intermediate body portions. The contact blade portions of the terminals in the two (top and bottom or upper and lower) rows are spaced apart from each other and also lie in different planes from each other. Preferably the contact blade portions of each row are parallel to each other but it is understood that due to manufacturing tolerances and other manufacturing considerations, the two sets of contact blade portions may not be parallel to each other.

In order to increase the density of the terminals within the connector 100, the associated adjacent terminals sets are "inverted" with respect to one another. This is most clearly shown in the plug connector shown in FIG. 6, where it can be seen that the ground terminals of alternating associated terminal sets, namely terminals 150 (G12), 152 (G56), 153 (G78) and 250 (G1112) lie along, or are supported on, one (the upper) leaf portion 114b of the connector housing 112 along with the signal terminals of intervening associated terminal sets, namely terminals 142, 143 (S3 & S4), 148, 149 (S9 & S10). In a similar, but opposite fashion, the signal terminals of the alternating associated terminal sets, namely 140, 141 (S1 & S2), 144, 145 (S5 & S6), 146, 147 (S7 & S8), and 240, 241 (S11 & S12) and the ground terminals of the intervening associated terminals sets, namely 151 (G34) and 154 (G910) lie along, or are supported by the other, or lower, leaf portion 114a. Other terminals, such as power in and out terminal 170 and a terminal 171 reserved for other use, may be located on either the upper or lower leaf portion, as illustrated in FIG. 6, which may be considered as a schematic diagram of both the plug connector shown in FIG. 4 and the receptacle connector shown in FIG. 1. A key member 173 may also be formed on one of the leaf portions to provide means for keying to the opposing plug connector 160.

By this structure, each pair of the differential signal terminals of the connector and its associated circuit board circuitry have an individual ground terminal associated with them that extends through the connector, thereby more closely resembling the interconnecting cable from an electrical performance aspect. The same inverted, triangular relationship is maintained in the plug connector 160, and this and the structure of the receptacle connector 100 keeps the signal wires of the cable "seeing" the ground in the same manner throughout the length of the cable and in substantially the same manner through the plug and receptacle connector interface and on to the circuit board.

The presence of an associated, distinct ground terminal with each pair of differential signal terminals importantly imparts capacitive, common mode, coupling between the three associated terminals as a set. This coupling will serve to reduce the impedance in that particular region of the connector and serves to reduce the overall impedance variation through the entire cable to board interface. As such, the present invention obtains an impedance curves that more closely emulates the straight line baseline 50 of the Impedance curve of FIG. 15. The sizes on the terminals and their spacing may be varied to in effect, "tune" the impedance of the connector.

The effect of this tunability is explained in FIG. 15, in which a reduction in the overall impedance discontinuity occurring through a cable to circuit board connector assembly. The impedance discontinuity that is expected to occur in the connectors of the present invention is shown by the dashed line 60 of FIG. 15. The solid line of FIG. 15 represents the typical impedance discontinuity that is experienced in the connector system, and by comparing the dashed and solid lines, the magnitudes of the peaks and valleys of this discontinuity, $H_{11}$, $H_{22}$ and $H_{33}$ are greatly reduced. The present invention is believed to significantly reduce the overall discontinuity experienced in a conventional connector assembly. In one application, it is believed that the highest level of discontinuity will be about 135 ohms (at $H_{11}$) while the lowest level of discontinuity will be about 85 ohms (at $H_{22}$). The target baseline impedance of connectors of the invention will typically be may vary from about 28 to about 150 ohms, but will preferably be in the range of between about 100 to about 110 ohms with a tolerance of about +/−5 to +/−25 ohms. It is contemplated therefore that the connectors of the present invention will have a total discontinuity (the difference between $H_{11}$ and $H_{22}$) of about 50 ohms or less, which results in a decrease from the conventional discontinuity of about 90 ohms referred to above of as much as almost 50%. This benefit is believed to originate from the capacitive coupling that occurs among the two differential signal terminals and their associated ground terminal. It will be understood, however, that capacitive coupling is but one aspect that affects the ultimate characteristic impedance of the terminals and the connector supporting them.

In the embodiments shown in FIGS. 1–6, the width of the ground terminal contact blade portions are preferably larger than the corresponding contact blade portions of the signal terminals. In some instances, a portion of the ground terminal may overlie or overlap, a portion of at least one of its associated signal terminals and in other instances, the ground terminal may lie between or abut imaginary lines that extend up from the side edges of the signal terminals. In instances where the ground terminals are larger than their associate signal terminals by virtue of their increased width, they will have more surface area than a signal terminal and hence, increased coupling.

Figure 7:
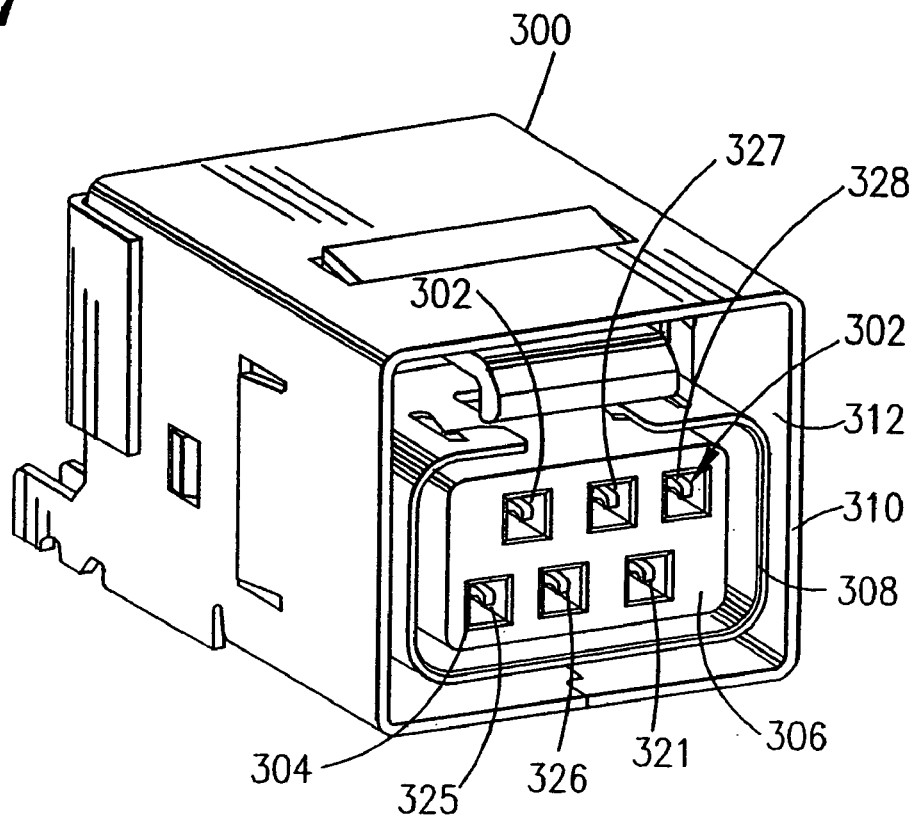
FIG. 7 is a perspective view of another embodiment of a connector constructed in accordance with the principles of the present invention having only two associated signal-ground terminal sets and which utilizes low-force helix style terminals rather than flat blade terminals.
Figure 8:
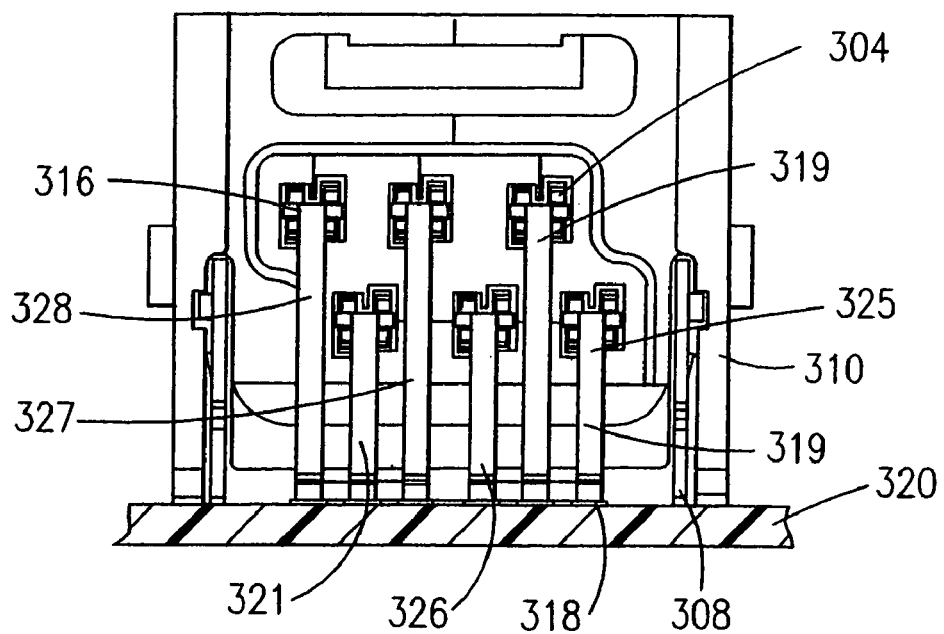
FIG. 8 is a rear elevational view of the connector of FIG. 7.
Figure 11:
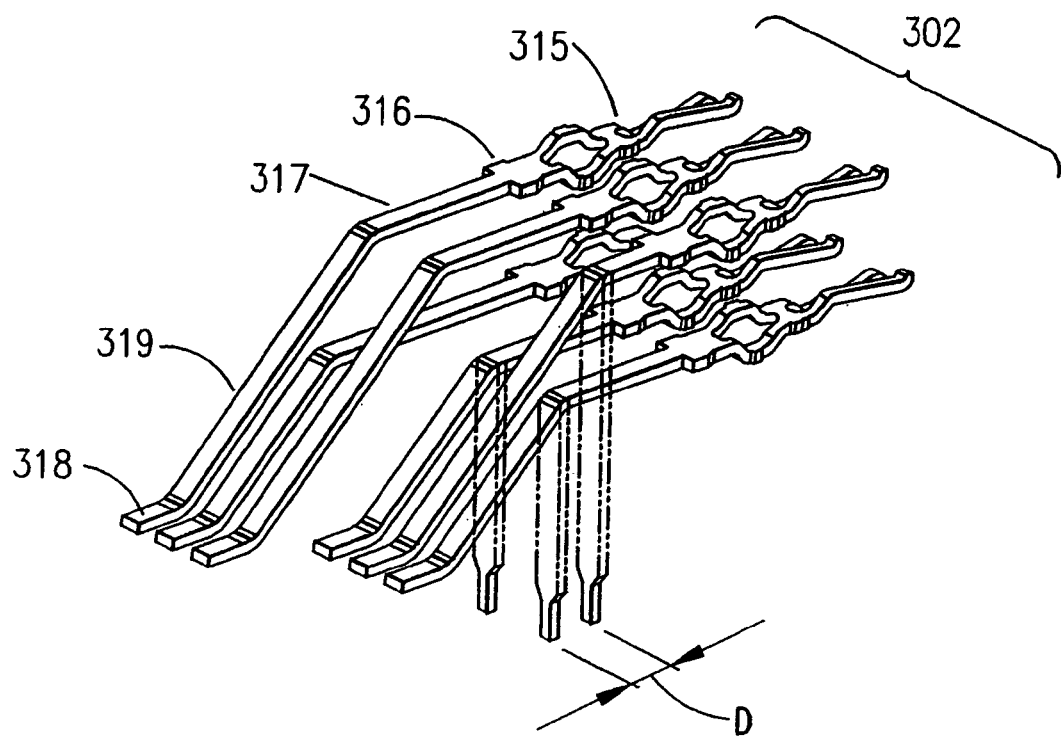
FIG. 11 is a perspective view of a terminal set used in the connector of FIG. 7, illustrating the relative position of and orientation of the terminals to other terminals within their associated terminal sets.

FIG. 7 illustrates another embodiment 300 of a connector incorporating the principles of the present invention and utilizing terminals having pin-type contact portions as opposed to the flat contact blade portion of FIGS. 1–6 In this connector 300, helix-style terminals 302 are utilized and each such terminal 302 is housed within an individual associated cavity 304 of the dielectric connector housing 306. The cavities 304 and their associated terminals 302 are disposed in the connector housing in two rows, as illustrated. The base structure of the contact portions of this type of terminals is described generally in U.S. Pat. No. 4,740,180, issued Apr. 26, 1988. As shown in FIG. 11, each terminal 302 in this style connector 300, has such a helix-style contact portion 315 that extends out from a body portion 316 that is used to hold the terminal 302 in place within its associated connector housing cavity 304, and a tail portion 318 that as shown may be used for mounting the connector 300 to a surface of a circuit board 320. The tail portions 318 of the terminals 302 are connected to the contact and body portions by way of interconnecting portions 319. Although the planes of the contact portions 315 are different (but preferably parallel), the planes of the interconnecting portions 319 and the tail portions 318 are preferably common.

Figures 16, 17:
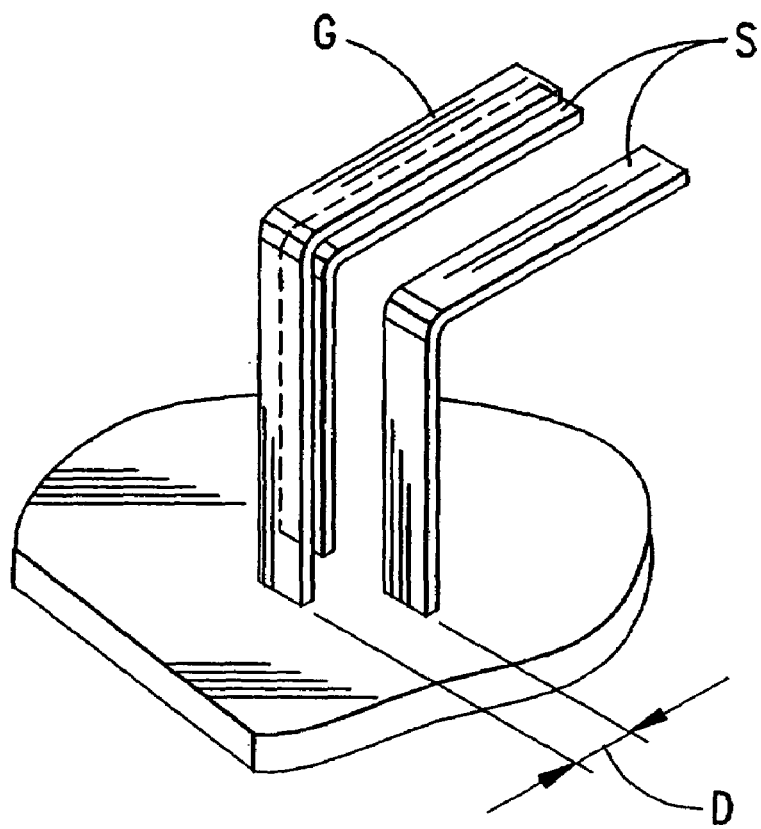
FIG. 16 is a diagrammatic perspective view of a set of terminals of the through-hole style, illustrating how the tail portions and their interconnecting portions need not be in the same plane.
FIG. 17 is a diagrammatic view of an automotive-type connector utilizing the inverted triad structure of the present invention.

The tail portions 318 of these type terminals are all surface mount tails and, hence lie in a single, common plane that coincides with the top surface of a circuit board (not shown) to which the connector is mounted. However, as illustrated in FIG. 11 (in phantom) and FIG. 16, the terminals may utilize through-hole mounting tails. In this instance, the tails and the body portion of the terminals will not lie in a common plane, but rather, the ground and signal terminals may lie in different planes (vertical planes are shown in FIGS. 11 and 16) and be spaced apart from each other by a spacing "D". In this arrangement, the tails 318 occur as part of the interconnecting body portions 319 and the ground terminal tail is spaced apart from the signal terminal tails.

Figure 9:
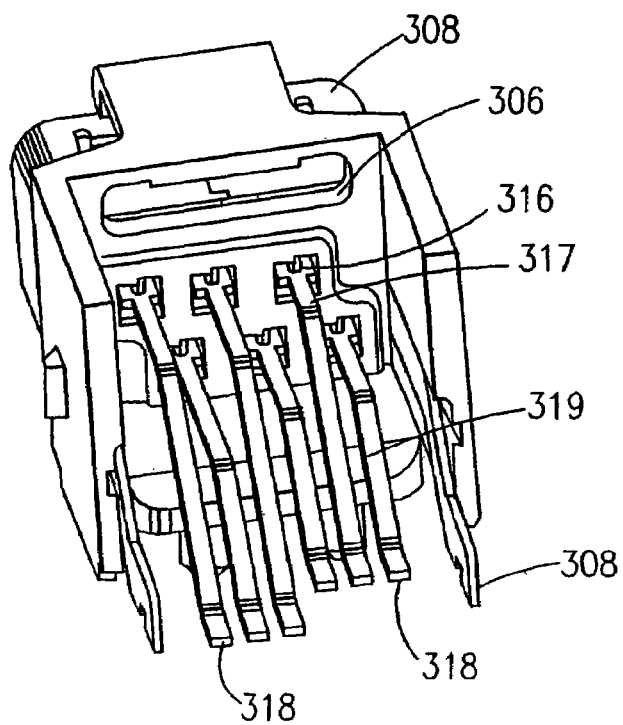
FIG. 9 is a perspective view of the connector of FIG. 7, taken from the rear with its external shell removed for clarity.
Figure 10:
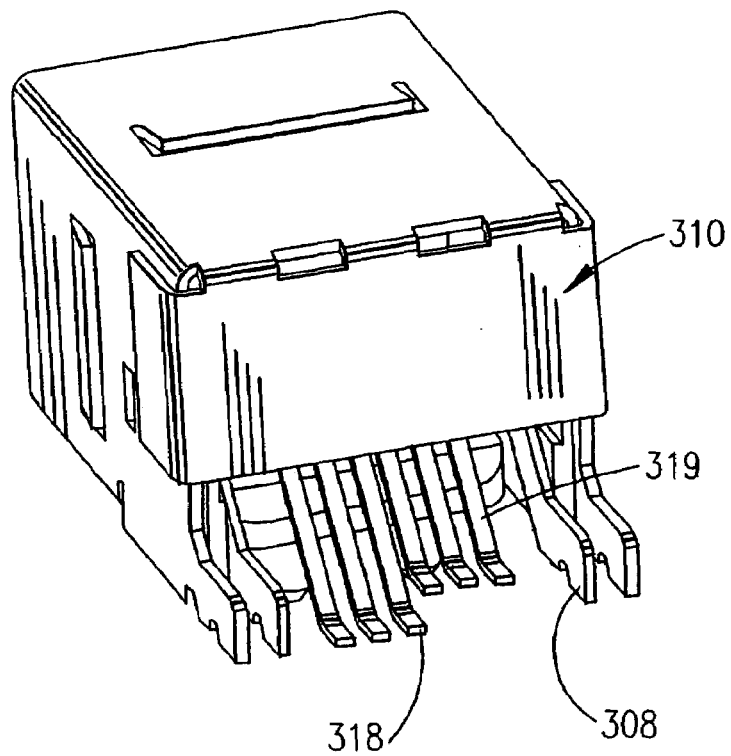
FIG. 10 is a perspective view of the connectors of FIG. 7, taken from the rear but with its external shell applied thereto.

The connector 300 may include a pair of shield, inner shield 308 and an outer shield 310 to provide shielding to the overall connector structure. The inner shield 308 may extend over a portion of the connector housing 306 as shown in FIG. 9, and the outer shield 310 may extend over substantially all of the connector housing 306 in a manner well known in the art. In this embodiment, the connector 300 does not include any ancillary terminals, such as power in and out, or a status detection terminal as might be utilized in the connector of FIGS. 1–6.

In this embodiment, two ground terminals 320, 321 are utilized and are respectively associated each with a pair of differential signal terminals 325, 326 and 327, 328. The signal terminals and ground terminal of each associated set are arranged in the desired triangular fashion and the sets are inverted with respect to each other, meaning that if the connector is considered as having two distinct rows of terminals, the ground terminal 320 of one set is located in one terminal row, while the ground terminal of the other differential terminal set is located in the other terminal row. Likewise, the signal terminals of each differential terminal set are inverted. This type of application is useful on multiple signal channel applications, where each differential terminal set is used to convey data from a different and distinct channel.

Figure 12:
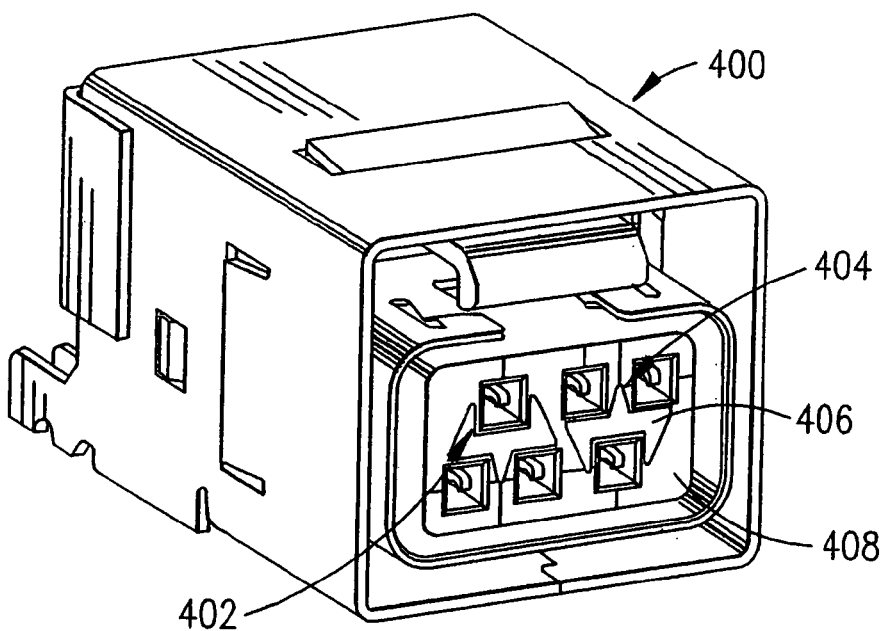
FIG. 12 is a perspective view of another receptacle-style connector constructed in accordance with the principles of the present invention and incorporating recesses within the connector housing to provide a dielectric gap among terminals of each associated terminal set.

FIG. 12 illustrates another embodiment 400 of a connector constructed in accordance with the principles of the present invention. In this embodiment, two sets 402, 404 of differential terminals are illustrated in an inverted triangular fashion, but the three terminals that make up each differential set are partially separated by a recess, or cavity 406 formed in the front face of the connector housing 408. This cavity has a depth less than the depth of the connector housing and may preferably range between about 0.5 mm to about 10 mm. This depth provides a hollow air gap or air "pool" at the mating face of the connector housing and serves to provide a measure of electrical isolation between by modifying the affinity of each of the terminals within a triplet will have for each other. The recess 406 serves to somewhat "tie" the three terminals together by virtue of its use of air as a dielectric. As illustrated, it is preferable that the recess lie within the boundaries of an imaginary triangle connecting the three terminals of the triplet together.

Figure 13:
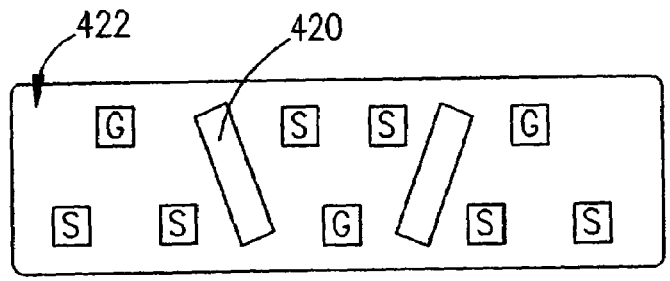
FIG. 13 is a schematic view of another receptacle-style connector diagrammatically illustrating another use of an air, or dielectric gap between associated terminal sets.

FIG. 13 illustrates schematically, how a recess, or cavity, 420 may be formed in a connector housing 422 to isolate differential terminal sets from each other. The recess 420 in this instance may project much deeper into the connector housing than the recess shown in FIG. 12, and may extend, if need be, entirely through the connector housing. In this type of structure, the cavities 420 provide a deep air channel with the air having a different dielectric constant than the connector housing material and thus will serve to electrically isolate terminal triplets from each other.

Figure 14:
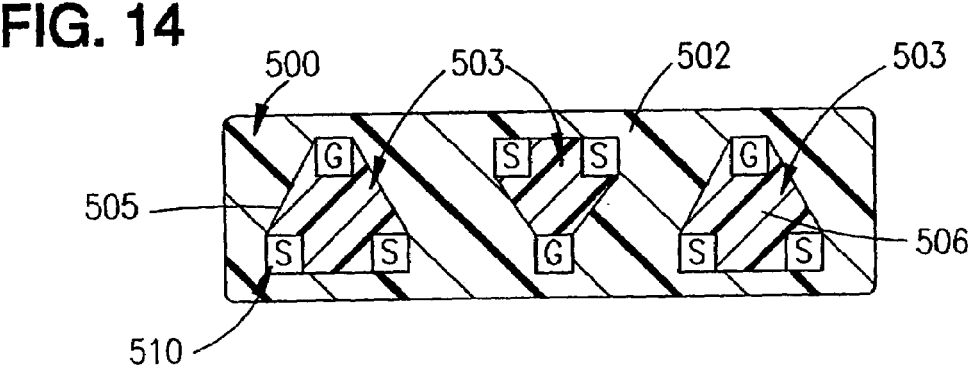
FIG. 14 is a diagrammatic view of another receptacle-style connector constructed in accordance with the principles of the present invention, and illustrating a terminal arrangement wherein each set of associated terminals are previously formed on a dielectric body as an insert that may be inserted into the connector housing.

FIG. 14 illustrates yet another embodiment 500 in which terminal set "inserts" are formed by insert or otherwise molding a set of three associated terminals 510 (including two signal terminals S and one ground reference terminal G) onto a dielectric support 506 that may have the general triangular configuration shown in FIG. 14 to form a distinct insert or module that may be inserted into a corresponding cavity. The terminals of each such associated set are maintained in their triangular orientation by the support 506 so that the two signal terminals are spaced apart from each other and the ground terminal is spaced apart from the signal terminals. These inserts, or modules, are then inserted into the connector housing 502 into complementary shaped cavities 505. In this manner, different dielectric materials are present among the terminals of each associated terminal set as well as between adjacent terminal sets, which are also inverted. The dielectric constant of the molded support 506 will be different than that of the connector housing 502 to provide another means of electrical isolation between terminal triplets and enhance the electrical affinity, at least in terms of coupling, among the terminals of each triplet. In instances where the support material of the terminal set has a dielectric constant higher than that of the surrounding connector housing, the coupling among the terminals in the triplet will be increased, thereby driving the impedance of the triplet down. Conversely, where the support material of the terminal set has a dielectric constant lower than that of the surrounding connector housing, the coupling among the terminals in the triplet will be decreased, thereby driving the impedance of the triplet up. Hence, the impedance of the connector may be tuned, both overall and within individual triplet sets (or signal channels).

FIG. 17 illustrates the implementation of the inverted structure of the present invention in a pin-type automotive connector 600 that is explained n greater detail below with respect to FIGS. 21–33. The connector 600 has an insulative housing 601 with a plurality of cavities 602 formed therein. Each such cavity 602 preferably includes a conductive terminal disposed therein, although in some applications, certain of the cavities may be empty or "blind". As shown in FIG. 17, two signal channels are shown, each of which includes a terminal triplet 603, 604, with two signal terminals A+, A−, B+, B− associated with a single ground terminal GRA and GRB. In this type of application, the terminal triplets or triads may be separated by power "ground" type terminals, i.e., voltage in and voltage return, +Vcc and −Vcc. The terminals extend through to the rear of the housing 601, where they may be terminated to corresponding wires of a wire harness or to a circuit board. The opposing connector will utilize projecting terminals arranged in the same manner to mate with the connector 600.

Turning to FIG. 18, one "internal" environment is depicted in which the present invention may be used. In this environment, the connectors of the present invention are disposed inside of the exterior wall 1108 of an electronic device, such as a computer 1101. Hence, the reference to "internal." The connectors of the present invention may also be used in an "external" application, as illustrated in FIG. 19, wherein one of the connectors 1110 is mounted to the PCB 1103, but extends partly through the exterior wall 1108 of the device 1101 so that it may be accessed by a user from the exterior of the device 1101. The connector assembly 1100 includes a pair of first and second inter-engaging connectors, described herein as a respective receptacle (or socket) connector 1110 and a plug connector 1104. One of these two connectors 1110 is mounted to the PCB 1103 of the device 1101, while the other connector 1104 is typically terminated to a cable 1105 that leads to a peripheral device.

The structure of the socket connector 1110 illustrated in FIG. 19 permits it to be used in the "internal" application shown in FIG. 18, as well as in "external" applications where the connector 1110 is mounted to the circuit board 1103, but where the connector 1110 extends partially through and is accessible from an exterior wall 1108 of the electronic device.

FIG. 21 is a cross-sectional view of a typical cable, generally designated by reference numeral 1105. The illustrated cable complies with the IEEE 1394b standard for use in interconnecting high speed electronic equipment, specifically in an automotive environment. Cable 1105 may contain two pairs of twisted pair wires 1114 and 1115 disposed within cable 1105 in side-by-side relationship, such as along a generally horizontal axis in the orientation shown in FIG. 5. For example, the signals present on the twisted pair 1114 may be referred to as A+ and A− and the signals present on the twisted pair 1115 may be referred to as B+ and B−. Twisted pairs 1114 and 1115 extend the length of the cable and may be of #24 AWG wire that is surrounded by an electrically insulating cover. The twisted pairs may be disposed in an electrically conductive shield 1118 and 1119, respectively, such as a metal foil, braided wire, or the like. Such conductive shields 1118 and 1119 may utilized as a ground in cable 1105. If used, a pair of power conductors 1116 and 1117 may also be disposed within cable 1105, such as along the vertical orientation depicted in FIG. 5. An electrically insulating cover 1120 typically encases the twisted pairs 1114 and 1115, and the power conductors 1116 and 1117. Additionally, another conductive shield (not shown) such as conductive foil or braided wire may be disposed underneath the cover 1120 of cable 1105.

Figure 22:
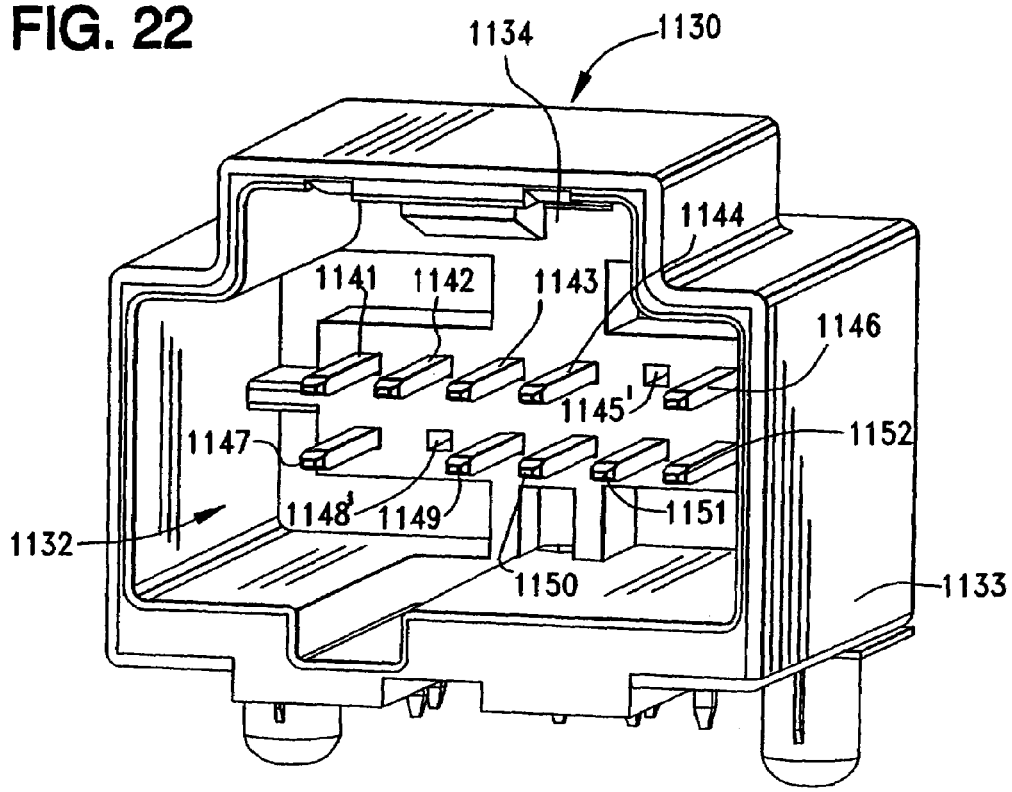
FIG. 22 is a front perspective view of another embodiment of a connector constructed in accordance with the present invention, and suitable for mounting on a printed circuit board.
Figure 23:
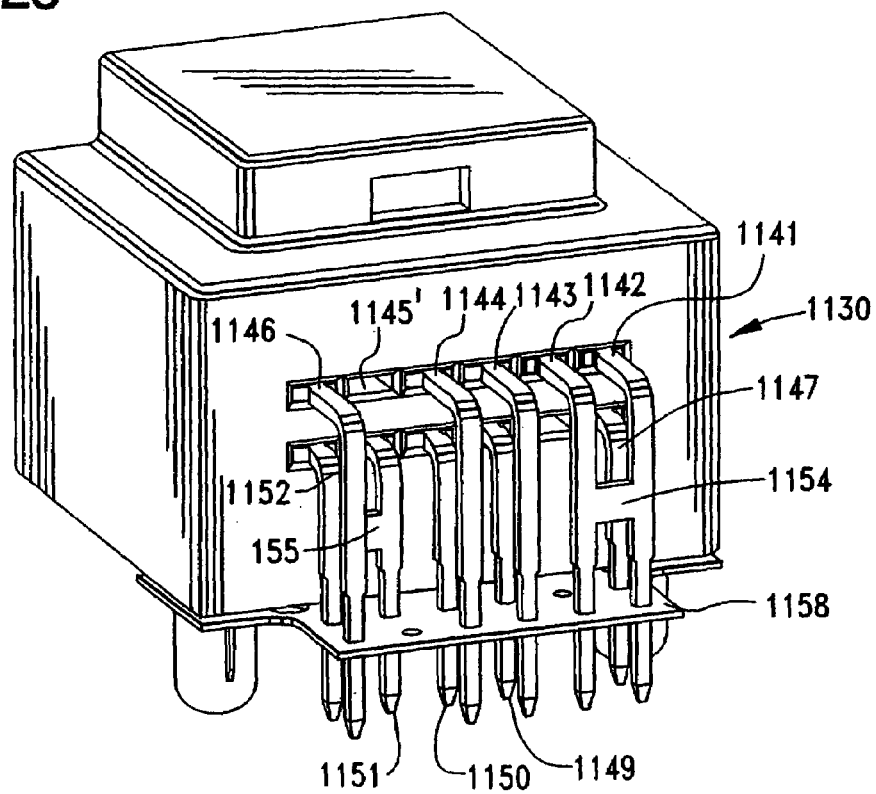
FIG. 23 is a rear perspective view of the connector illustrated in FIG. 22.
Figure 24:
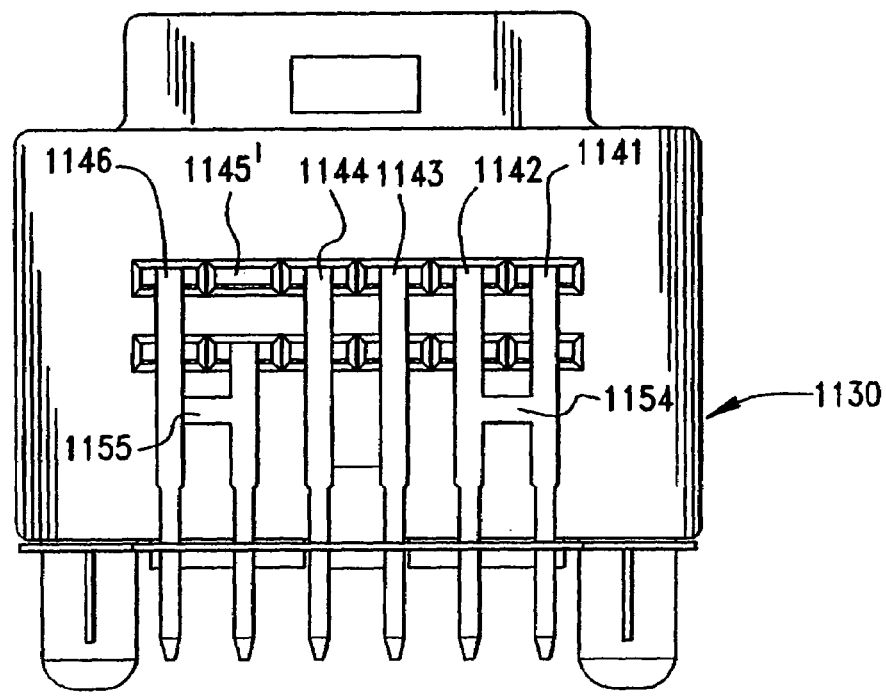
FIG. 24 is a rear elevational view of the connector illustrated in FIGS. 22 and 23.

FIGS. 22 through 24 are views of a receptacle or socket connector 1130, constructed in accordance with the principles of the present invention, that is particularly suitable for use in automotive applications. As seen in FIG. 22, the connector 1130 includes a mating cavity, generally designated 1132, for receiving a complementary shaped plug connector 1140 (FIG. 15). Connector 1130 includes an electrically insulative housing 1133 that may be formed from a dielectric material. If desired, portions of the outer surfaces of connector 1130 may be fabricated with a metallic conductive coating or shield to provide electromagnetic shielding for the electrically conductive terminals therein. A back wall 1134 of connector 1130 is configured with a plurality of cavities for receiving and supporting a plurality of electrically conductive terminals 1141 through 1152. These terminal-receiving cavities preferably extend completely through the connector housing 1133.

As mentioned earlier, one of the objects of the present invention is to provide a connector having an impedance that more closely resembles that of the system (such as the cable) impedance than is typically found in multi-circuit connectors. The present invention accomplishes this by way of what shall be referred to herein as a modified or pseudo "triplet". A conventional triplet is an arrangement of three distinct terminals in a generally triangular configuration. Such a conventional triplet further involves the use of two differential signal terminals and a single associated ground terminal that are arranged to mate with corresponding terminals of the plug connector 1140 which are terminated to the wires of a differential (preferably a twisted pair of wires), such as one of the twisted pairs 1114 or 1115 in FIG. 21 and a ground. The terminals that form the triplet carry signals that are complements of each other; for example, +1.0 volts and −1.0 volts as well as a ground complement.

In accordance with a primary aspect of the present invention, the terminals 1141–1152 of the connector 1130 in FIG. 22 are selected to provide an equivalent triplet. In order to "tune" the electrical characteristics of the connector 1130 and more closely emulate the impedance of the system, a plurality of ground terminals is provided in association with each set of differential signal terminals. For example, in the connector 1130 of FIG. 22, two terminals 1147 and 1149 may be selected for the differential pair signals A+ and A− and terminals 1141 and 1142 may be selected as ground terminals associated with the A+ and A−signals to form a first equivalent triplet. As is understood in the art, this set of differential signal terminals 1147, 1149 and the pair of associated ground terminals 1141, 1142 define a single differential signal transmission line, or channel.

Similarly, the terminals 1144, 1146, 1151 and 1152 may constitute a second differential signal transmission line or channel, with terminal 1144 & 1146 being chosen for the differential pair signals B+ and B− and terminals 1151 & 1152 being chosen as the ground terminals associated with the B+ and B− signals to form a second equivalent triplet. Note that the signals A+ and A− are selected to be at the left of the lower row of terminals 1147–1152 while the signals B+ and B− are selected to be at the right of the upper row of terminals 1141–1146 so that the two differential signal transmission channels are located in different areas of the connector. In this respect, the triplet formed by terminals 1144, 1146 and 1151–1152 may be said to be inverted from the triplet formed by terminals 1141–1142, 1147 and 1149. This provides better isolation of the nearest signal terminals of the respective triplets, such as terminals 1144 and 1149 than if these signal terminals were adjacently disposed in the same row. These triplets may also be described in terms of their spatial location in that imaginary lines drawn through the centers of the two differential signal terminals of one signal transmission channel and one of the two ground terminals of that same channel define a triangular pattern and the centers of these terminal define vertices of the imaginary triangle. Such imaginary triangular patterns may be inverted as shown in the drawings. Terminals 1143 and 1150 may be reserved for electrical power, or may be additional ground terminals. If reserved for power, terminals 1143 and 1150 will emulate the low impedance of the ground terminals at the higher frequencies of the signals on the signal terminals 1144, 1146–1147 and 149. For this reason, terminals 1143 and 1150 may be referred to as "power grounds".

In accordance with another primary aspect of the present invention, the terminal position between the differential signal terminals is left vacant or unused. For example, the terminal position 1145' between differential signal terminals 1144 and 1146 is unused. This causes the horizontal spacing between terminals 1144 and 1146 to be greater than the vertical spacing between terminals 1144 and 1146 and the nearest ground or power ground terminal, such as terminals 1150–1152. The horizontal spacing between the differential signal terminal of each signal channel is also greater than the horizontal spacing between the associated ground terminals of that same signal channel. The result is that the differential signal terminals 144 and 146 will be somewhat decoupled. By contrast, the differential signal terminals will be more closely coupled to the ground and power ground terminals 1150–1152 which will lower the impedance in connector 1130 to the signals present on differential signal terminals 1144 and 1146 at the signal frequencies of interest.

Similarly, a vacant or unused terminal position 1148' is interposed between the differential signal terminals 1147 and 1149 in the other triplet for the same reasons and to the same effect. Preferably, no terminals are inserted into the vacant terminal positions 1145' and 148' since any terminals inserted into these positions would tend to defeat the desired level of decoupling between the respective signal terminals 1144, 1146 and 1147, 1149. Thus, when all of the terminals in connector 1130 are collectively referred to herein as terminals 1141–1152, it will be understood that there may be no terminals in terminal positions 1145' and 1148'.

As seen in FIGS. 23 and 24, ground terminals 1141 and 1142 are preferably bridged by a conductive metal portion 1154 to provide a common ground, thereby further reducing the impedance seen at the connector. Similarly, ground terminals 1151 and 1152 are bridged by a conductive metal portion 1155 to provide a common ground for the same purpose and to the same effect. The metal bridging portions 1154 and 1155 may be integrally formed at the time that the ground terminals are manufactured, or may thereafter be added, such as by known welding techniques. It can be seen from the drawings that the bridging portions 1154, 1155 are located on what may be referred to as the body portions of the terminals and these body portions are portions that interconnect the tails and contact portions of each terminal together. Although the bridging portions are illustrated on the vertical extend of the terminals and not the horizontal extent in which the terminal contact portions lie, it will be understood that they may be located in other areas of the two ground terminals, including the horizontal extents thereof. Preferably the interconnection occurs between the contact and tail portions of the terminals. The interconnection of two terminals cooperatively defines a common ground path for the pair of differential signal terminal associated with the ground terminals.

If terminals 1143 and 1150 are not needed for power, these terminals may also be used as ground terminals, and the bridging portions 1154 and 1155 may extend from the other adjacently located ground terminals to terminals 1143 and 1150, thereby providing three adjacent bridged and common ground terminals 1141–1143 in the upper row associated with differential signal terminals 1147 and 1149. Similarly, three adjacent bridged and common ground terminals 1150–1152 in the lower row will be associated with the differential signal terminals 1144 and 1146.

Although the preferred embodiment illustrates terminals 1141–1152 arranged in two parallel rows, or in two spaced apart and parallel planes, it will be understood that such these terminals need not lie in exact parallel rows or spaced apart and parallel planes to obtain the advantages of the invention. For example, connector 1130 may be provided with only one set of triplets instead of the two sets illustrated in FIGS. 22–24. Since one of the primary aspects of the invention is to provide a plurality of ground terminals in closer spatial relationship with the signal terminals than with each other, the two inverted triplets in FIG. 22 may be separated or spaced apart with the benefits of the invention continuing to be maintained. Also, there is no need that the rows defined by the ground terminals and by the signal terminals of the two triplets be in alignment, i.e., the triplets could be in staggered relationship as long as each triplets remains in effect.

With this equivalent triplet structure, each pair of the differential signal terminals of the cable or circuit have an individual ground terminal associated with them that extends from end-to-end through the connector, thereby more closely emulating both the cable and its associated plug connector from an electrical performance aspect. Such a structure keeps the signal wires of the cable "seeing" the ground in the same manner throughout the length of the cable and in substantially the same manner through the plug and receptacle connector interface and on to the circuit board. This connector interface is shown schematically in FIG. 20. and may be considered as divided into four distinct Regions, I–IV, insofar as the impedance and electrical performance of the overall connection assembly or system is concerned. Region I refers to the cable 105 and its structure, while Region II refers to the termination area between the cable connector 104 and the cable 105 when the cable is terminated to the connector. Region III refers to the mating interface existent between the cable connector and the board connector 110 that includes the mating body portion of the connectors 104, 110. Region IV refers to the area that includes the termination between the board connector 110 and the circuit board 103. The lines "P, N, and M" of FIG. 20 have been superimposed upon FIG. 15.

The presence of an associated ground with the signal terminals importantly imparts capacitive coupling between the three terminals. This coupling is one aspect that affects the ultimate characteristic impedance of the terminals and their connector. The resistance, terminal material and self-inductance are also components that affect the overall characteristic impedance of the connector insofar as the triplet of terminals is concerned. In the embodiment shown in FIG. 22, the effective width of the ground terminals 1141–1142, combined with the power ground terminal 1143, is sufficiently broad to extend over the signal terminals 1147 and 1149. Collectively, terminals 1141–1143 provide an effective ground plane in proximity to the signal terminals 1147 and 1149. This ground plane defined by terminals 1141–1143 is closer to the signal terminals than the signal terminals are to each other, and hence like coupling between the signal terminals is maintained. This permits the impedance of the connector to be tuned from a spacing aspect.

The effect of this tunability is explained in FIG. 15, in which a reduction in the overall impedance discontinuity or variation occurring through the connector assembly is demonstrated. The impedance discontinuity that is expected to occur in the connectors of the present invention is shown by the dashed line 60 of FIG. 15. It will be noted that the magnitude of the peaks and valleys, $H_{11}$, $H_{22}$ and $H_{33}$ is greatly reduced. The present invention is believed to significantly reduce the overall discontinuity experienced in a conventional connector assembly. In one application, it is believed that the highest level of discontinuity will be about 135 ohms (at $H_{11}$) while the lowest level of discontinuity will be about 85 ohms (at $H_{22}$). The target baseline impedance of connectors of the invention will typically be about 110 ohms with a tolerance of about +/−25 ohms. It is contemplated therefore that the connectors of the present invention will have a total discontinuity (the difference between $H_{11}$ and $H_{22}$) of about 50 ohms, which results in a decrease from the conventional discontinuity of about 90 ohms referred to above by as much as almost 50%.

Returning now to FIGS. 22–24, as terminals 1141–1152 pass through the back wall 1134 of connector 1130, each terminal bends through about 90 degrees to extend downwardly (FIG. 7) to make electrical connection with a printed circuit board, such as PCB 1103 in FIGS. 18 & 19. As the terminals extend downwardly, it is important to maintain the same spatial relationship of the terminals to one another, as discussed above with respect to the terminal location and spatial relationships within the cavity 1132 in FIG. 22. This will maintain the equivalent triplet relationships, and therefore the improved impedance performance. No matter what planes the terminals lie in, it is desired to maintain the triplet arrangement of the terminals. By manipulating the distance between the ground and signal terminals, the impedance of the system may be changed, or "tuned." This is done because capacitive coupling occurs between the two signal wires (and terminals) as well as each of the signal lines and the ground lines (and terminals). The spacing of the terminals also affects the impedance of the system. The widths of the ground and signal terminals also affects the coupling and the impedance of the system, which also includes the resistance of the terminals, which in turn is also a function of the dimensions of the terminals.

Prior to insertion in a printed circuit board, the downwardly depending terminals 1141–1152 in FIG. 23 are maintained in the desired spatial relationship by perforations in an insulative membrane 1158 that is attached to the underside of connector 1130. After the connector 1130 is inserted in a printed circuit board, the through-holes and solder provide a stronger means of maintaining the spatial relationships amongst the various terminals.

Figure 26:
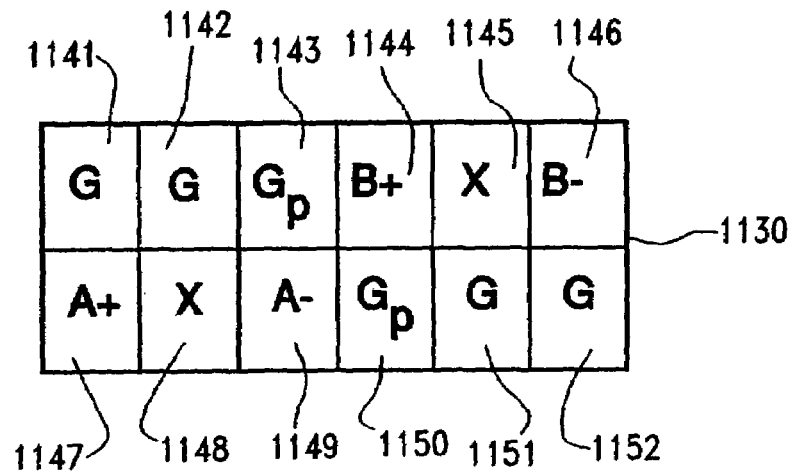
FIG. 26 is a diagrammatic view of the arrangement and the placement of two pairs of signal terminals disposed adjacently to pairs of ground terminals of the connector illustrated in FIGS. 22 through 24, with a vacant or unused terminal interposed between the pairs of signal terminals, in accordance with the invention.
Figure 27:
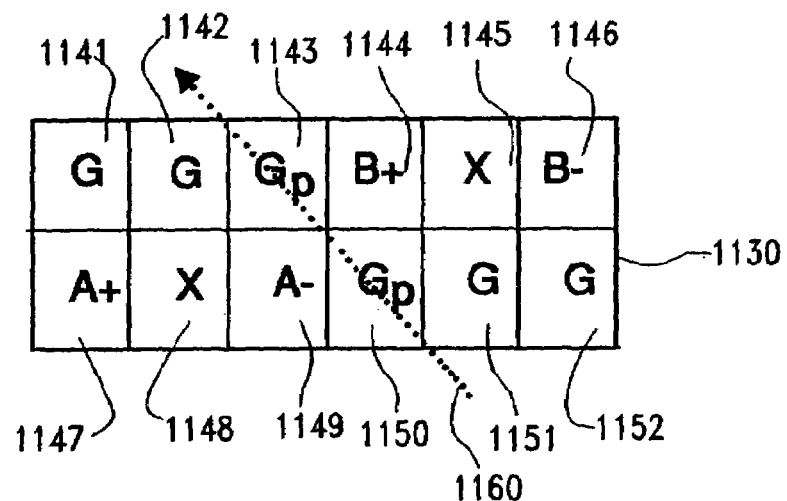
FIG. 27 is a diagrammatic view of the arrangement and placement of the terminals, similar to FIG. 26, but illustrating the diagonal placement of the power terminals between inverted pairs of signal terminals in accordance with the invention.
Figure 28:
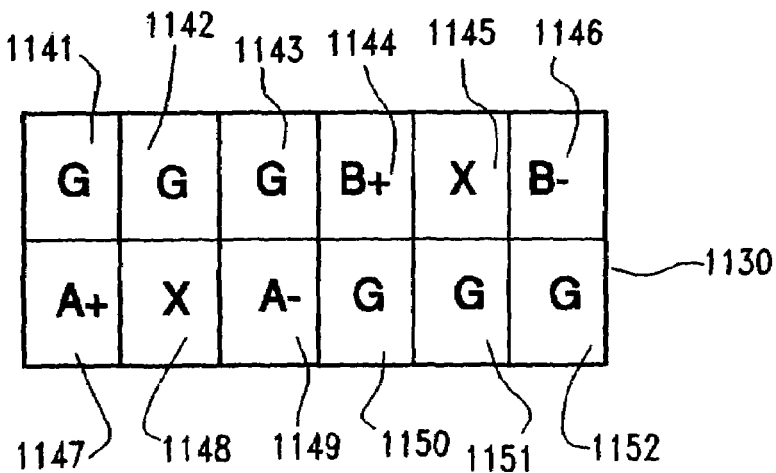
FIG. 28 is another diagrammatic view of the arrangement and the inverted placement of two pairs of signal terminals disposed adjacently to three ground terminals in modified triplet configurations, with a vacant or unused terminal interposed between the pairs of signal terminals, in accordance with the invention.
Figure 29:
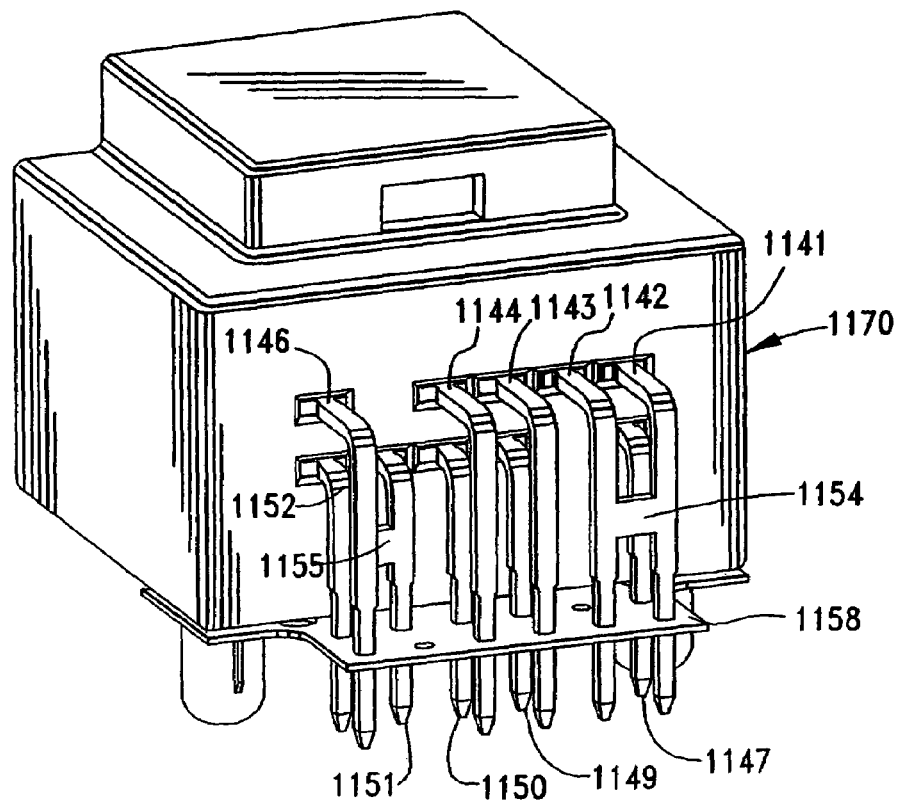
FIG. 29 is a rear perspective view of the connector illustrated in FIG. 25.
Figure 30:
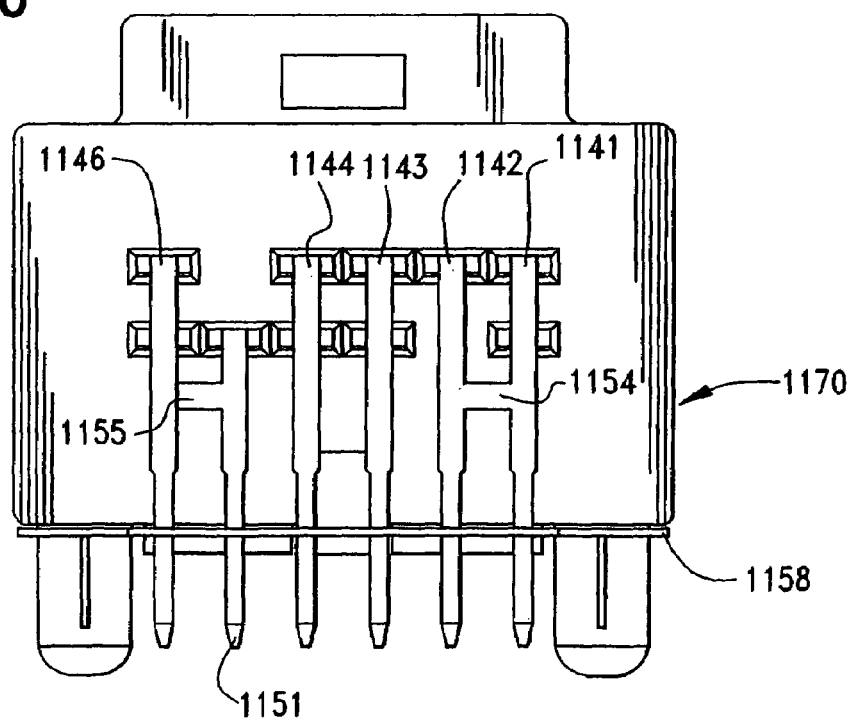
FIG. 30 is a rear elevational view of the connector illustrated in FIGS. 25 and 29.

The relationships among the various terminals are shown in diagrammatically in FIGS. 26–28. Each of these diagrams illustrates two rows of six terminals, with the rows being parallel to one another. Each diagram also shows that terminals 1141, 1142, 1151 and 1152 are selected to be ground terminals G, that terminal positions 1145 and 1148 are unused or vacant terminals X, that terminal positions 1144 and 1146 are the differential signal terminals B+ and B−, respectively, and that terminal positions 1147 and 1149 are the differential signal terminals A+ and A−, respectively. In FIGS. 26 and 27, terminal positions 1143 and 1150 are the terminals power ground Gp. In FIG. 28, terminal positions 1143 and 1150 are additional ground terminals G, as in those situations where power is not supplied through the connector 1130. In FIG. 27, a diagonal line 160 indicates the diagonal orientation or placement of the ground power terminals between the triplet defined by terminals 1141–1142, 1147 and 1149, and the triplet defined by terminals 1144, 1146 and 1151–1152. This diagonal line may be considered as a line of symmetry that separates the differential pairs and their associated grounds. Five terminal passages are on each side of the line of symmetry and the orientation of the signal and ground terminals. However, as previously stated above, the ground power terminals Gp act as additional ground terminals due to the typical low impedance of a power supply.

Figure 25:
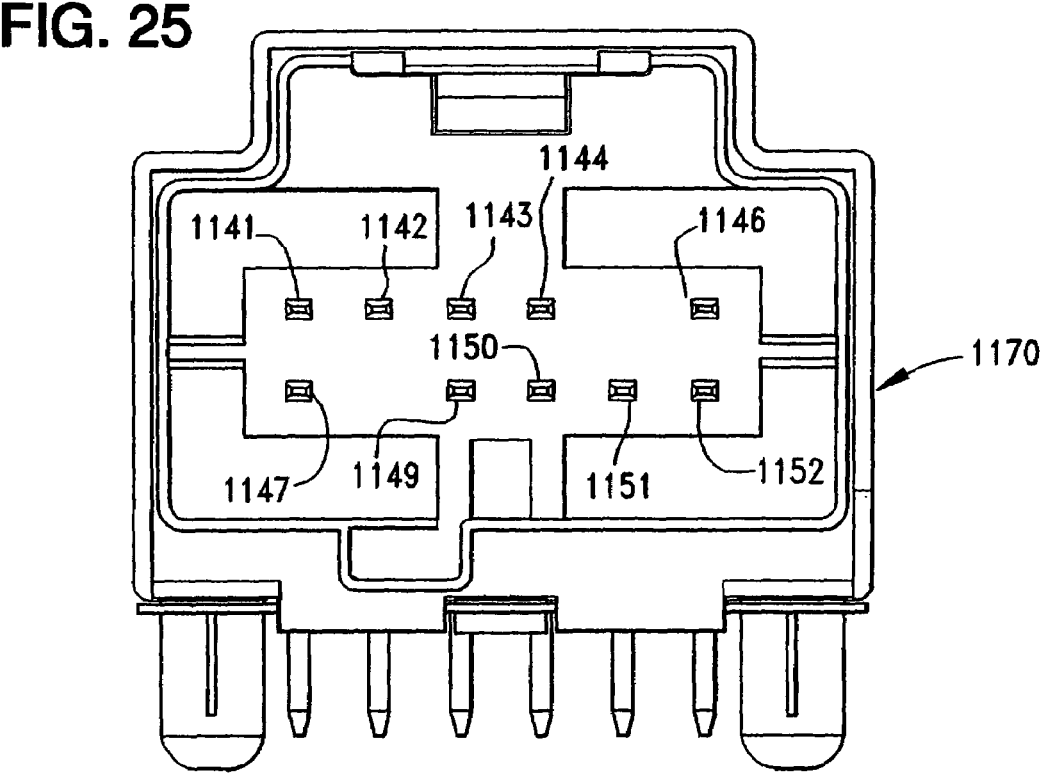
FIG. 25 is a front elevational view of another embodiment of the connector illustrated in FIGS. 22 through 24 and also suitable for mounting to a printed circuit board, but with the unused terminal locations between the pairs of signal terminals vacant in accordance with another aspect of the present invention.

An alternative embodiment of a connector 1170 constructed in accordance with the invention is illustrated in FIGS. 25–30. This alternative embodiment is substantially identical in structure and operation to the connector 1130 of FIGS. 22–24, except that connector 1170 is formed without the unused or vacant terminal positions 1145' and 1148' of FIGS. 22–24. However, this embodiment continues to maintain the spacing between the differential signal terminals as though the vacant terminal positions 1145' and 1148' were present, as in FIGS. 22–24. The absence of the vacant terminal positions 1145' and 1148' in the embodiment illustrated in FIGS. 25 and 29 may assist in avoiding mistakes during assembly, such as by inserting terminals into the desired vacant terminal positions. As is illustrated in FIG. 25, in this embodiment, the connector is formed without the terminal-receiving passages that are left vacant so that mis-insertion of terminals into these vacant positions may be avoided during assembly of the connector.

Figure 31:
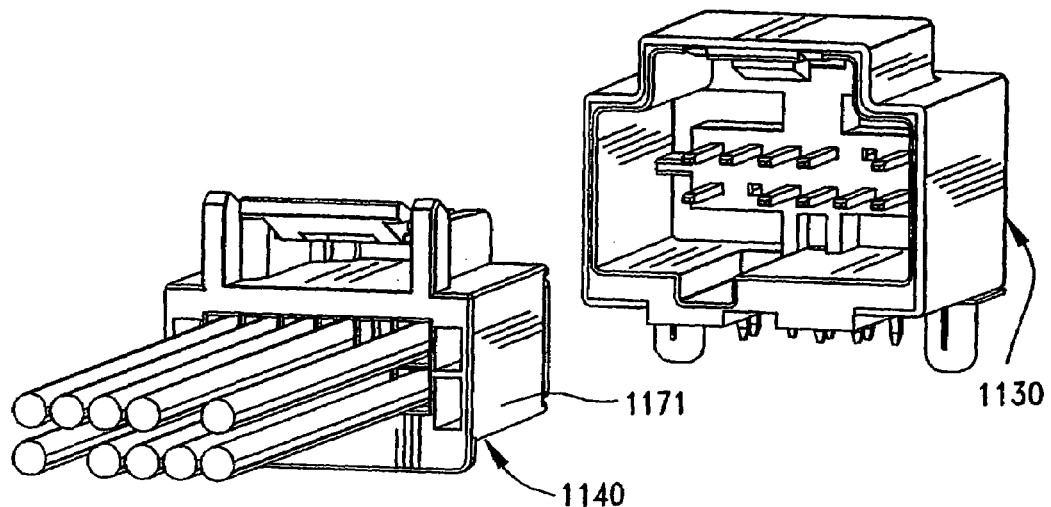
FIG. 31 is an exploded perspective view of the connector illustrated in FIGS. 22 through 24 with a mating plug including wires extending from each used terminal position.
Figure 32:
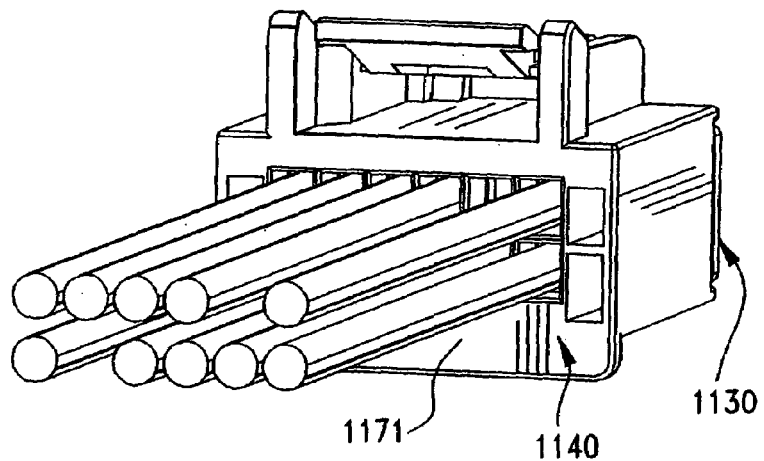
FIG. 32 is a perspective view of the connector portions illustrated in FIG. 31, but with the connector and the mating plug connected together; and, FIG. 33 is a perspective view, similar to FIG. 12, but with two multiple-wire signal cables terminating in the mating plug, and two individual power wires also terminating in the mating plug in a diagonal orientation between the two signal cables.
Figure 33:
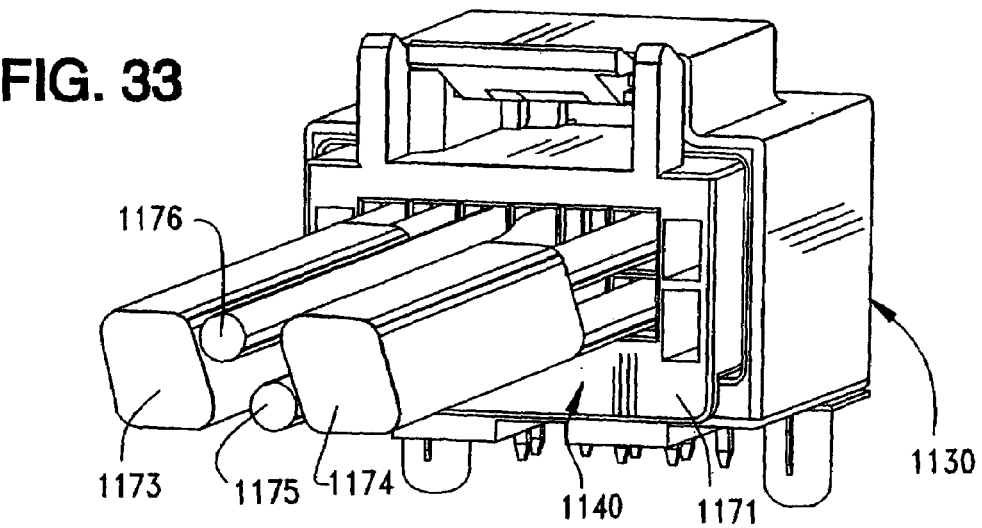

FIGS. 31–33 illustrate the socket connector 1130 of FIGS. 22–24 in combination with an opposing mating connector 1140. Mating connector 1140 has an insulative connector housing 1171 formed from a dielectric material in a complementary configuration to the cavity 1134 of the receptacle connector 1130 so as to facilitate and ensure the proper mating therebetween. The housing 1171 contains a plurality of internal cavities for securing and supporting mating terminals (not shown) that electrically engage the terminals 1141–1152 of the connector 1130 when the mating connector is fully inserted into the cavity 1134 of connector 1130. In this respect, the internal cavities and the terminals of mating connector 1140 are configured and spaced to align with the corresponding terminals 1141–1152 of connector 1130. Thus, mating connector 1140 also maintains the desired triplet configuration between the differential signal terminals and the plurality of ground terminals. Accordingly, mating connector 1140 also provides a relatively low impedance deviation as shown by the impedance curve 60 in FIG. 15.

The wires from the cable may be individually terminated in mating connector 1140, as shown in FIGS. 15 and 16. Alternatively, as shown in FIG. 17, each of the triplets in the form of a cable 1173 and 1174, and consisting of the differential signal pairs and the plurality of grounds, may be terminated at the mating connector 1140, with the power wires 1175 and 1176 individually terminated.

While the preferred embodiments of the invention have been shown and described, it will be apparent to those skilled in the art that changes and modifications may be made therein without departing from the spirit of the invention, the scope of which is defined by the appended claims.

What is claimed is:

1. A contact arrangement for a differential signal connector having an insulative housing and a plurality of conductive terminals disposed in the housing, each of the terminals including contact portions for contacting opposing terminals of a mating connector, the contact arrangement comprising:
    said terminals defining at least a first differential signal channel that includes a first pair of differential signal terminal and a first pair of associated ground terminals, said first differential signal channel being arranged in first and second rows in said housing, the first row including said first pair of differential signal terminals and said second row including said first pair of associated ground terminals, said first pair of associated ground terminals being spaced apart from each other by a first distance, said first pair of differential signal terminals being spaced apart from each other by a second distance that is greater then the first distance.

2. The contact arrangement of claim 1, wherein said first pair of associated ground terminals are interconnected together.

3. The contact arrangement of claim 2, wherein said first pair of associated ground terminals are interconnected to each other between said contact and tail portions thereof.

4. The contact arrangement of claim 1, wherein said housing includes a plurality of terminal-receiving passages, and said first pair of differential signal terminals are received within two of the terminal-receiving passages and are separated from each other by an intervening, empty terminal-receiving passage.

5. The contact arrangement of claim 1, wherein said the terminals further define a second differential signal channel that includes a second pair of differential signal terminals and a second pair of associated ground terminals, the second pair of associated ground terminals being spaced apart from each other by said first distance, and said second pair of differential signal terminals being spaced apart from each other by said second distance.

6. The contact arrangement of claim 5, wherein said first pair of differential signal terminals are disposed in said first row of said housing and said second pair of differential signal terminals are disposed in said second row of said housing and said first pair of associated ground terminals are disposed in said second row of said housing and said second pair of associated ground terminals are disposed in said first row of said housing.

7. A contact arrangement for a differential signal connector having an insulative housing and a plurality of conductive terminals disposed in the housing, each of the terminals including contact portions for contacting opposing terminals of a mating connector, the contact arrangement comprising:
    a first pair of differential signal terminals and a first pair of associated ground terminals, said contact portions of said first pair of associated ground terminals being spaced apart from each other by a first distance, and said contact portions of said first pair of differential signal terminals being spaced apart from each other by a second distance that is greater then the first distance.

* * * * *